(12) United States Patent
Komedani et al.

(10) Patent No.: US 8,930,373 B2
(45) Date of Patent: Jan. 6, 2015

(54) SEARCHING WITH EXCLUSION TOKENS

(75) Inventors: Masaki Komedani, Yokohama (JP); Fumihiko Terui, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 13/530,525

(22) Filed: Jun. 22, 2012

(65) Prior Publication Data

US 2013/0007001 A1   Jan. 3, 2013

(30) Foreign Application Priority Data

Jul. 1, 2011   (JP) ................................. 2011-147417

(51) Int. Cl.
*G06F 7/00* (2006.01)
*G06F 17/30* (2006.01)
*G06F 17/27* (2006.01)

(52) U.S. Cl.
CPC ........ *G06F 17/30637* (2013.01); *G06F 17/271* (2013.01)
USPC ............................................. 707/741; 704/7

(58) Field of Classification Search
CPC ........................... G06F 17/271; G06F 17/2755
USPC ............................................. 707/741; 704/7
See application file for complete search history.

(56) References Cited

U.S. PATENT DOCUMENTS

| | | | | |
|---|---|---|---|---|
| 5,168,533 A * | 12/1992 | Kato et al. | ..................... | 382/229 |
| 6,396,951 B1 * | 5/2002 | Grefenstette | ................. | 382/187 |
| 7,010,754 B2 * | 3/2006 | Breuer | .......................... | 715/776 |
| 7,536,297 B2 * | 5/2009 | Byrd et al. | ..................... | 704/10 |
| 2001/0012007 A1 * | 8/2001 | Breuer | .......................... | 345/340 |
| 2003/0120479 A1 * | 6/2003 | Parkinson et al. | ................. | 704/4 |
| 2010/0049763 A1 * | 2/2010 | Jung et al. | ..................... | 707/721 |
| 2010/0250580 A1 * | 9/2010 | Balakrishnan et al. | ....... | 707/769 |

FOREIGN PATENT DOCUMENTS

JP   2010250389   11/2010

* cited by examiner

*Primary Examiner* — Cheyne D Ly
(74) *Attorney, Agent, or Firm* — Cantor Colburn LLP; Joseph Polimeni

(57) ABSTRACT

An aspect includes phrase searching using exclusion tokens. A token division unit is configured to divide an input character string to be searched into a plurality of tokens. A token position definition unit is configured to set each token to be excluded in an occurrence position calculation as an exclusion token and to set each token to be included in the occurrence position calculation as a headword token, and define an occurrence position for each headword token. A position offset information assigning unit is configured to assign, to each of the exclusion tokens, position information obtained with the headword token followed by the exclusion tokens and to assign the headword token followed by the exclusion tokens as a starting point. An indexing processing unit is configured to perform indexing on the plurality tokens such that whether or not the exclusion tokens follow one of the plurality of tokens is identifiable.

7 Claims, 15 Drawing Sheets

FIG. 4
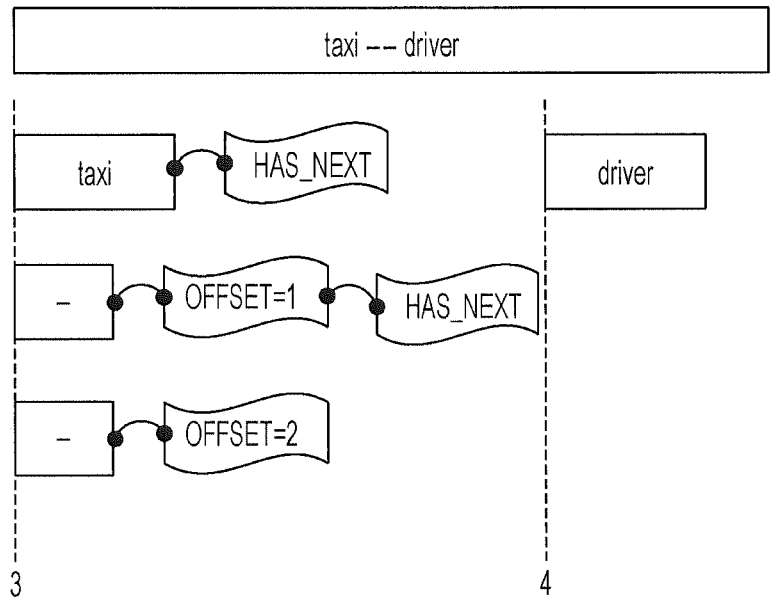
(A)
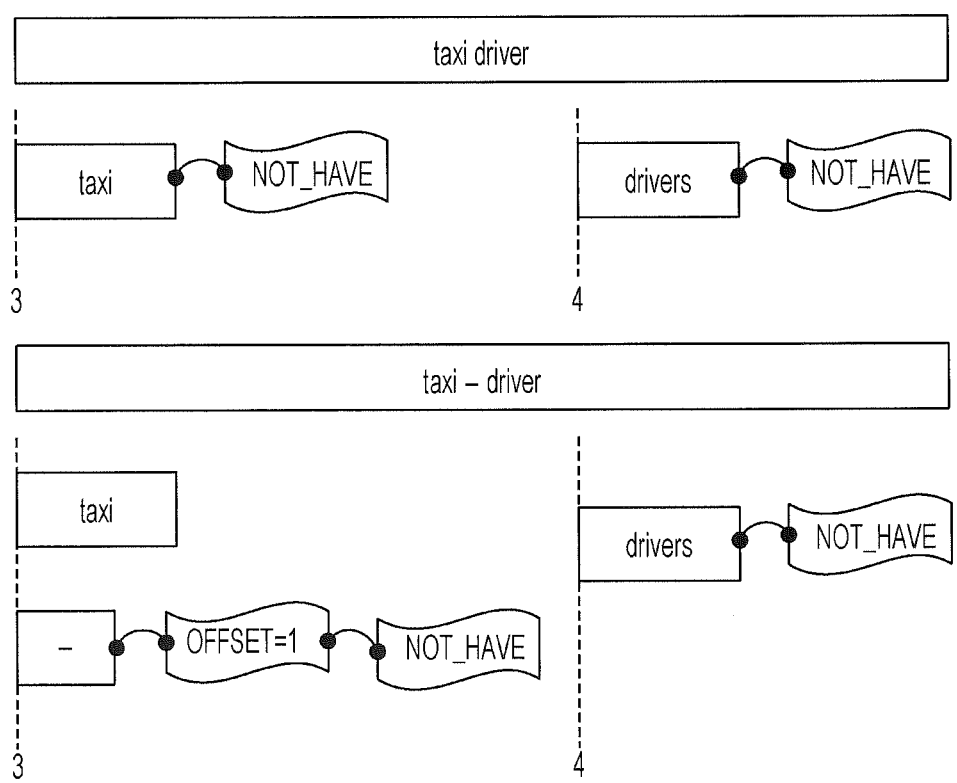
(B)

FIG. 6

| HEADWORD TOKEN | {(DOC_ID, TOKEN_POS, [HAS_NEXT])···} |
|---|---|
| "a" : | {(1, 2)···} |
| "driver" : | {(1, 4), (2, 4), (3, 6)···} |
| "he" : | {(1, 0), (2, 0),···} |
| "is" : | {(1, 1), (2, 1),···} |
| "it" : | {···} |
| "taxi" : | {(1, 3), (2, 3, true), (3, 5)···} |
| "the" : | {(2, 2)} |
| "what" : | {···} |
| "where" : | {···} |

| EXCLUSION TOKEN | {(DOC_ID, TOKEN_POS, [OFFSET], [HAS_NEXT])} |
|---|---|
| "-" : | {(2, 3, 1), (3, 5, 1, true), (3, 5, 2)···} |

FIG. 12
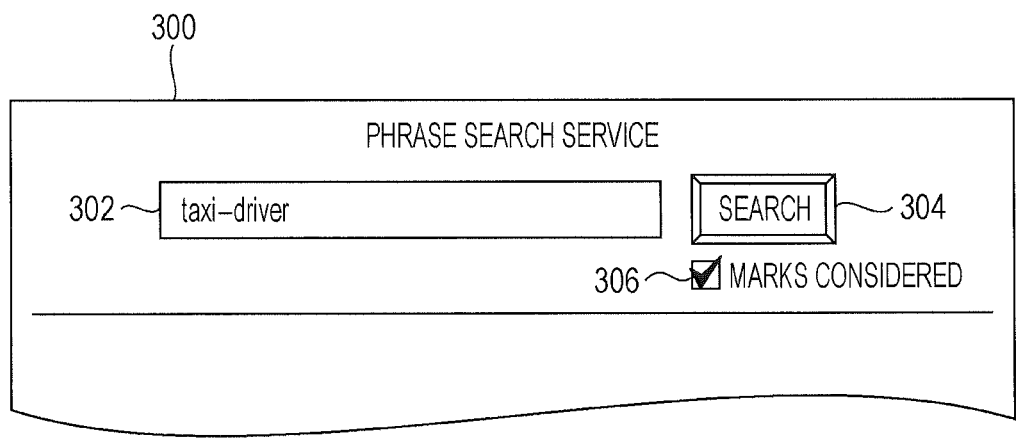
(A)
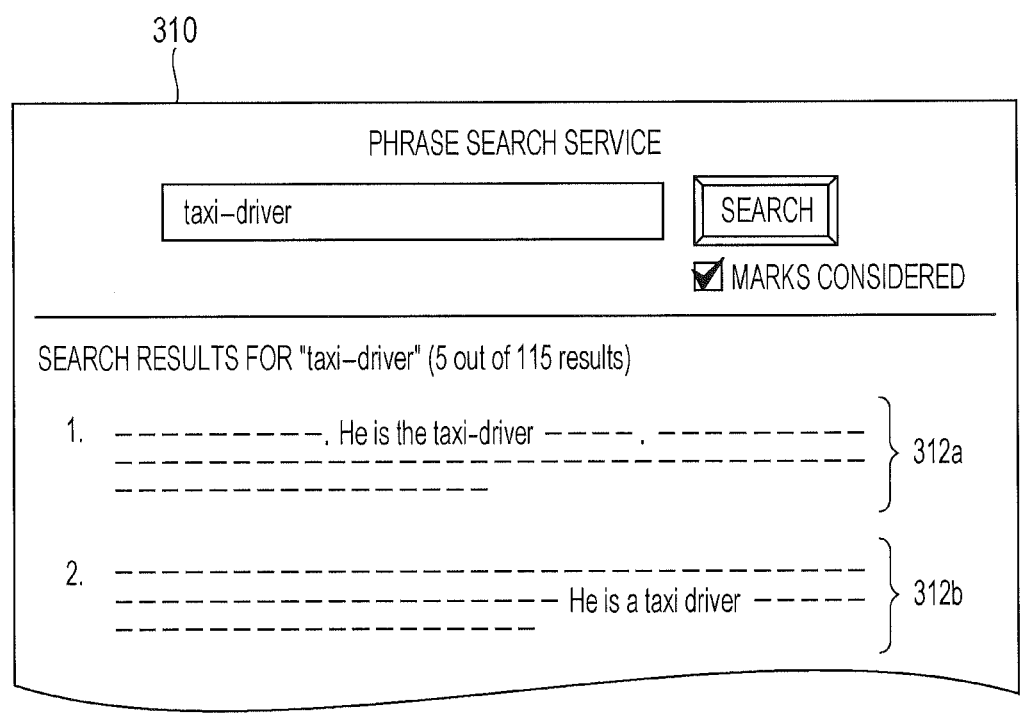
(B)

SEARCHING WITH EXCLUSION TOKENS

PRIORITY

The present application claims priority to Japan Patent Application No. 2011-147417, filed on Jul. 1, 2011, and all the benefits accruing therefrom under 35 U.S.C. §119, the contents of which in its entirety are herein incorporated by reference.

BACKGROUND

The present invention relates to information retrieval techniques. More specifically, the present invention relates to performing a phrase search using exclusion tokens.

Since the use of high-speed large-capacity communication infrastructures, such as computers and broadband environments, has become widespread, and information technology has been increasingly introduced in organizations such as public offices, universities, and companies, an enormous number of unformatted documents are created daily. Accordingly, there is an increasing demand for a search system capable of rapidly and precisely retrieving a document desired by a searcher.

In a search system, a character string of a document to be searched is divided into units (hereinafter, referred to as tokens), such as words and clauses, by using an appropriate character string division method. The resulting tokens are assigned position numbers in an order that the tokens appear in the original document, and are then stored in an inverted index. An input query text is also divided into predetermined units (hereinafter, referred to as search tokens), such as words and clauses. The search system determines whether or not to extract the document as a search result depending on whether or not the registered tokens of the document to be searched match the search tokens.

Various techniques intended for improving search precision are known. For example, a technique is known in which language identification and character string analysis, such as morphological analysis, are performed in order to accurately retrieve a document intended by a searcher from among many documents, thereby realizing a search having a higher precision than a search based on simple character string matching. In addition, Japanese Patent Application Publication No. 2010-250389 discloses a technique in which indexing is performed by dividing a document into tokens using two analysis methods, i.e., morphological analysis and N-gram, in order to suppress an insufficient search and obtain appropriate search results.

However, when advanced character string analysis is introduced, a document containing a partially matching character string is also included in search results because of influence of the advanced analysis result. As a result, a situation may occur where documents included in the search results are not necessarily desired by a searcher.

Meanwhile, punctuation marks and symbols may be arbitrarily used by a document creator. Thus, a general search system adopts a method in which punctuation marks and symbols are not used as headwords and are not indexed so that a search can be performed without being affected by the punctuation marks and symbols. However, such a system is incapable of performing a search in consideration of punctuation marks and symbols.

In a phrase search, whether or not consecutive position numbers are assigned to tokens that match search tokens contained in a phrase is determined using the position numbers assigned to the tokens. Accordingly, in order to support the phrase search, adjacent tokens in a document have to be indexed so that a difference between their position numbers is fixed (generally, to one). This restriction makes it difficult to include punctuation marks and symbols in headwords in the phrase search.

However, companies often use symbols in proper nouns, such as company names, project names, and product names. When a search process is performed with such symbols being omitted, a document desired by a searcher is undesirably excluded from search results. Although proper nouns can be registered as words in a dictionary, the dictionary registration work is troublesome and, furthermore, indices have to be re-created every time dictionary registration occurs. Thus, dictionary registration is insufficient as a solution.

SUMMARY

According to exemplary embodiments, a system, method, and computer program product for phrase searching using exclusion tokens are provided. An embodiment of the system includes a token division unit configured to divide an input character string to be searched into a plurality of tokens. The system also includes a token position definition unit configured to set each token to be excluded in an occurrence position calculation as an exclusion token and to set each token to be included in the occurrence position calculation as a headword token, and define an occurrence position for each headword token. The system further includes a position offset information assigning unit configured to assign, to each of the exclusion tokens, position information obtained with the headword token followed by the exclusion tokens and to assign the headword token followed by the exclusion tokens as a starting point. The system additionally includes an indexing processing unit configured to perform indexing on the plurality tokens such that whether or not the exclusion tokens follow one of the plurality of tokens is identifiable.

An embodiment of the method includes receiving a phrase search query containing a search token string comprising a plurality of tokens. The method also includes setting, by a computer, each token to be excluded in an occurrence position calculation as an exclusion token and each token to be included in the occurrence position calculation as a headword token. The method further includes reading index data including an occurrence position defined for each headword token constituting an input character string to be searched and with exclusion tokens being excluded, and position information to be assigned to each of the exclusion tokens and obtained with the headword token followed by the exclusion tokens. The method additionally includes extracting, by the computer based on a search process considering the exclusion tokens being requested, a token string that matches the search token string contained in the phrase search query not only in constituent tokens but also in occurrence positions and position information of the constituent tokens.

An embodiment of the computer program product for phrase searching using exclusion tokens according to the method is also provided.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

FIG. 4A is a diagram describing the process between division of an input character string into tokens and indexing regarding another example sentence;

FIG. 4B is a diagram describing the process between division of an input character string into tokens and indexing according to an embodiment;

FIG. 6 is a diagram illustrating a data structure of index data created in an embodiment;

FIG. 12 is a diagram illustrating browser screens;

DETAILED DESCRIPTION

Figure 1:
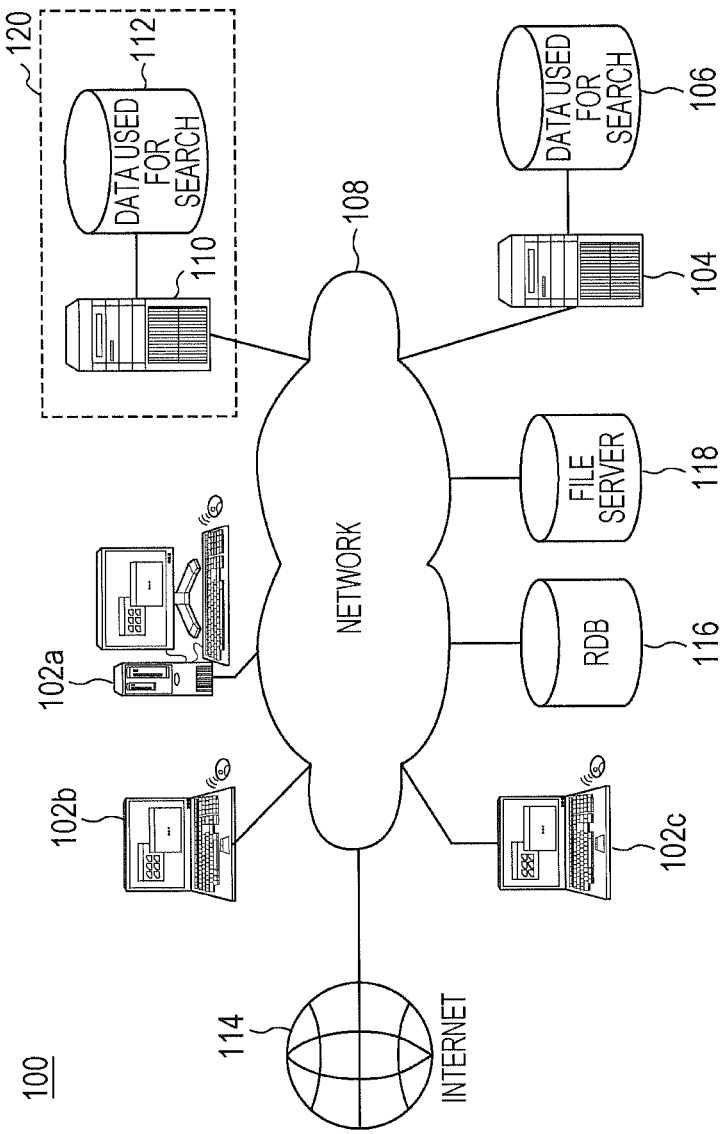
FIG. 1 is a schematic diagram of a search system in accordance with an embodiment.

FIG. 1 is a schematic diagram of a search system 100 according to an embodiment. The search system 100 includes a plurality of client computers (hereinafter, referred to as clients 102) 102*a*, 102*b*, 102*c* which can be used by searchers, and a server computer (hereinafter, referred to as a server) 104 which returns a search result in response to a search request received from each client 102.

The search system 100 may further include, as computers that store information to be searched (hereinafter, simply referred to as content), a relational database (RDB) 116 and a file server 118. Moreover, the search system 100 may be connected to an external network, such as Internet 114, via a router not illustrated. The search system 100 may set, as the search target, content located at storage locations indicated by resource identifiers, such as uniform resource locators (URLs) or uniform resource names (URNs).

The content to be searched may include various kinds of data that include character strings in data body such as document data, image data, and multimedia data and in metadata such as titles and headers. Hereinafter, an input character string included in each content and to be searched is referred to as document data.

The clients 102 and the server 104 are interconnected via a network 108. The network 108 may be configured as, but not limited to, a local area network (LAN) or a virtual private network based on a transaction protocol such as Ethernet (registered trademark) or transmission control protocol/internet protocol (TCP/IP), or a wide area network (WAN) connected with a dedicated line.

The server 104 can be configured by installing server programs, such as a common gateway interface (CGI), a server side include (SSI), and a servlet therein. For example, the server 104 is capable of processing a search request received from the client 102 and returning a search result to the client 102, by using the hypertext transfer protocol (HTTP). The server 104 includes a single-core or multi-core processor, a random access memory (RAM), a hard disk drive (HDD), and a network interface card (NIC), and is controlled by an appropriate operating system, such as WINDOWS (registered trademark) 200X, UNIX (registered trademark), or LINUX (registered trademark).

Each of the clients 102 is configured by installing a web browser or the like therein. The client 102 issues a search request to the server 104 that manages data used for search 106, and acquires a search result and displays the search result on the browser. The client 102 is configured as a general-purpose computer, such as a personal computer or workstation, which includes a processor, a RAM, an HDD, a NIC, a display device, and input devices such as a pointing device and a keyboard. The client 102 is also controlled by an appropriate operating system.

The server 104 manages the data used for search 106, which includes index data used for searching for content. The data used for search 106 is stored in a file system or database configured in a storage device, such as an HDD, in a computer-accessible format. Hardware and software of the server 104 according to the embodiment operate in cooperation with each other, whereby the server 104 provides both functions of an index creation apparatus and functions of a search engine. Here, the functions of the index creation apparatus indicate functions for creating the data used for search 106, which is used for searching for content located in information sources, such as the RDB 116, the file server 118, and the Internet 114. The functions of the search engine indicate functions for returning a search result in response to a search request received from the client 102.

When content is registered in the data used for search 106, in order to add the content to the search target, the server 104 applies a token division processing method, such as a morphological analysis method, onto document data included in the content so as to generate a token string. The server 104 then indexes the token string along with information for identifying an occurrence position of each token in the document data, and registers the indexed data in the data used for search 106 in association with a pointer pointing to a location where the content exists, such as a uniform resource identifier (URI).

FIG. 1 also illustrates another embodiment of the search system 100. In the other embodiment illustrated in FIG. 1, hardware and software of the server 104 operate in cooperation with each other, whereby the server 104 provides the functions of the search engine. On the other hand, a server 110 indicated by a broken-line frame 120 is separately provided. Hardware and software of the server 110 operate in cooperation with each other, whereby the server 110 provides functions of an index creation apparatus, such as management of data used for search 112, acquisition and indexing of content.

In the other embodiment illustrated in FIG. 1, the data used for search 106 is synchronized with the data used for search 112 managed by the server 110.

Although not illustrated, in still another embodiment, the search system 100 may be configured as a desktop search system in a computer system. In this case, the search system 100 has the functions of the index creation apparatus, the functions of the search engine, and the functions of the client.

Figure 2:
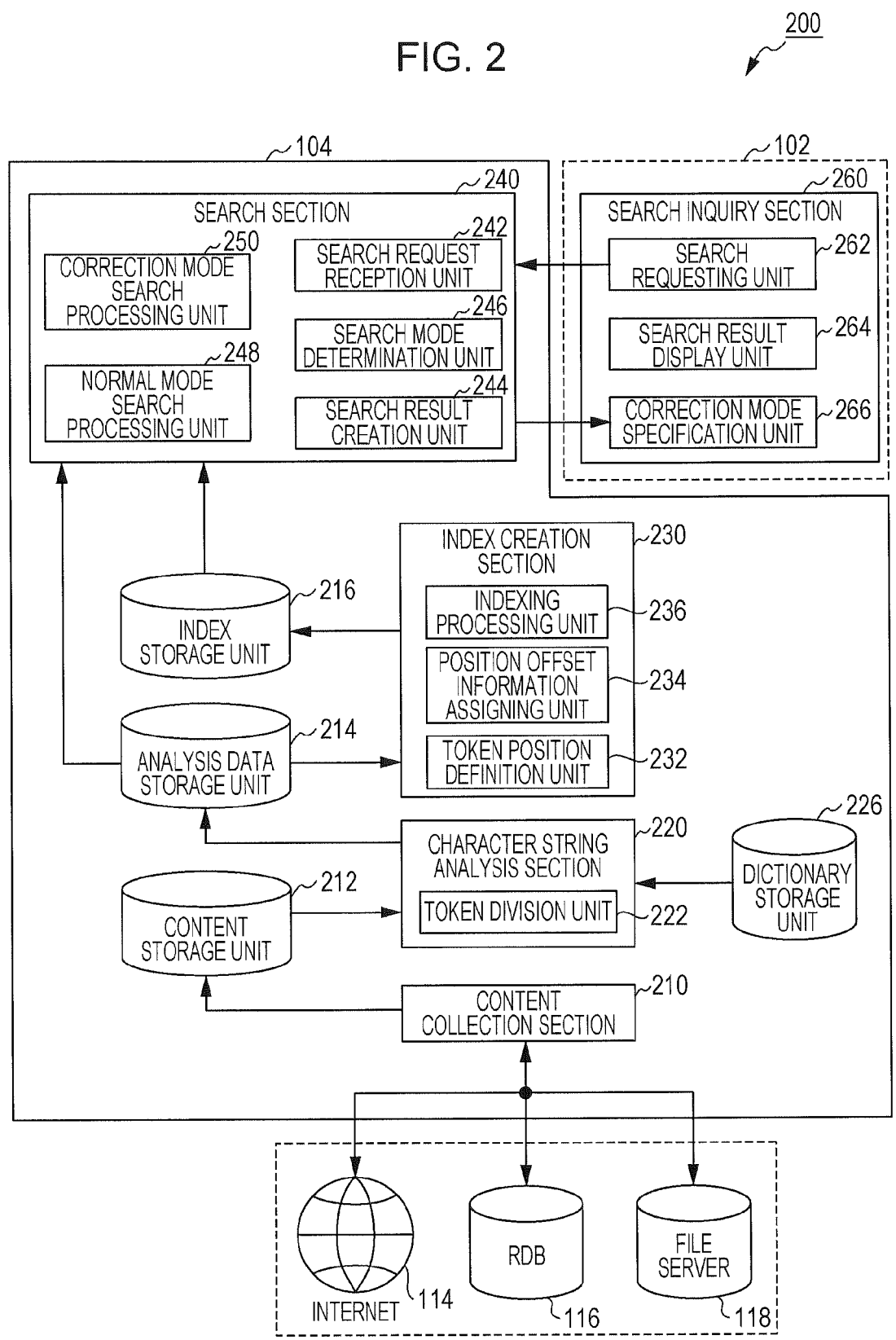
FIG. 2 is functional block diagram of a search system implemented in a server and a client in accordance with an embodiment.

FIG. 2 illustrates functional blocks 200 of the search system 100, which are implemented in the server 104 and the client 102 according to the embodiment. A program is loaded into memory of the client 102 and executed, and operations of individual hardware resources are controlled, whereby each functional section included in the client 102 illustrated in FIG. 2 is implemented in the client 102. The client 102 has a user interface section including a display device and input devices, and a communication processing section including a NIC. In accordance with an input supplied to the user interface section, the client 102 sends a search request to the server 104 using the communication processing section. The client 102 also receives a search result returned from the server 104 in response to the search request via the communication processing section, and causes the display device of the user interface section to present the search result.

A program is loaded into memory of the server 104 and is executed, and operations of individual hardware resources are controlled, whereby each functional section included in the server 104 illustrated in FIG. 2 is implemented in the server 104. The server 104 has a communication processing section including a NIC.

Referring to FIG. 2, the server 104 according to the embodiment includes a content collection section 210, a character string analysis section 220, an index creation section 230, and a search section 240.

The content collection section 210 is a functional section that collects information to be added or updated as a search target. The content collection section 210 collects content from preset information sources, e.g., the RDB 116, the file server 118, and predetermined URLs from the Internet 114. The content collection section 210 then stores the collected content in a content storage unit 212 in association with a pointer to the content. The content storage unit 212 is configured as a database or file system in a storage device, such as an HDD.

The character string analysis section 220 is a functional section that extracts document data from content having various data formats stored in the content storage unit 212, and performs a character string analysis process including language identification and morphological analysis on the document data. The character string analysis section 220 stores, as a result of the character string analysis process, analysis data in an analysis data storage unit 214 in association with the original content. The analysis data storage unit 214 is configured as a database or file system in a storage device, such as an HDD.

The index creation section 230 is a functional section that reads out the analysis data stored in the analysis data storage unit 214, performs an indexing process on the analysis data, and stores the resulting index data in an index storage unit 216. The index storage unit 216 is configured as a database or file system in a storage device, such as an HDD, and stores the index data in a data structure that enables a rapid response to a search request. The index data stored in the index storage unit 216 can be preferably configured as an inverted index which includes information indicating an occurrence position where each token appears in the document data.

The search section 240 is a functional section that performs a search process in response to a search request received from the client 102, with reference to the index data stored in the index storage unit 216. After completing the search process, the search section 240 returns a search result to the client 102.

The character string analysis section 220 and the index creation section 230 related to the index creation function, and the search section 240 related to the search function will be described in detail below for each processing operation.

(1) Character String Analysis Performed by Server

The character string analysis section 220 extracts document data from content having various data formats stored in the content storage unit 212, and performs character string analysis on the document data. For example, regarding content written in a structured language, such as hypertext markup language (HTML) or extensible markup language (XML), the character string analysis section 220 performs a tag removal process or the like to extract document data. Regarding binary format data, such as portable document format (PDF) files or files created with specific document creation applications, the character string analysis section 220 extracts document data by using an appropriate document filter.

More specifically, the character string analysis section 220 includes a token division unit 222. The token division unit 222 applies a morphological analysis method corresponding to the identified language onto the extracted document data, thereby obtaining tokens from an input character string of the document data with reference to grammatical rules and dictionaries stored in a dictionary storage unit 226. In this way, the token division unit 222 divides the document data into a string of one or more tokens. In the embodiment to be described, it is assumed that division to tokens is performed using the morphological analysis method. However, in another embodiment, an N-gram method may be adopted instead of or along with the morphological analysis method. Regarding languages, such as English, in which a space is inserted between words, a division method may be adopted in which character strings are divided based on spaces, symbols, or the like.

The token string obtained from the document data is stored as analysis data in association with the original content. The analysis data is stored in association with, for example, a document identifier (DOC_ID) uniquely assigned to the corresponding content, and a pointer such as a URI of the content.

In this embodiment, the obtained tokens can be classified into headword tokens and exclusion tokens. Headword tokens are tokens that are registered as headwords to be considered when occurrence positions are calculated in the indexing process, which will be described in detail later. Exclusion tokens are tokens that are excluded when occurrence positions are calculated but may be considered when a search is performed.

The exclusion tokens can include tokens that are excluded from headwords in a general phrase search because of a restriction regarding position numbers in the phrase search since those tokens correspond to punctuation marks and symbols that are arbitrarily attached by a document creator. In this embodiment, exclusion tokens are excluded when occurrence positions are calculated but may be considered when a search is performed. Thus, the exclusion tokens can be included in the analysis data and the index data.

More specifically, the exclusion tokens include tokens for writing symbols generally called punctuation marks, such as "kuten" (a Japanese period), "toten" (a Japanese comma), a comma, a period, a colon, a semicolon, an apostrophe, an asterisk, an atmark, brackets (such as round brackets, double round brackets, Japanese square brackets, Japanese double square brackets, square brackets, and angle brackets), ellipses (such as a two-dot ellipsis and a three-dot ellipsis), an interpunct (interpoint), a hyphen, a double hyphen, an exclamation mark, a question mark, "kome-jirushi" (a symbol used for footnotes in Japanese), a dash, a wave dash, and "odori-moji" (symbols used in Japanese when the previous character is repeated) or repetition symbols. Additionally, the exclusion tokens may include tokens for pictorial symbols used in a text messaging service for mobile phones.

Writing symbols to be considered as the exclusion tokens during a search may be arbitrary selected. An administrator of the search system 100 can pre-register these writing symbols in a dictionary or the like. When there are tokens which are ignored both in calculation of occurrence positions and in a search, these tokens may be deleted in advance from the obtained token string.

Figure 3:
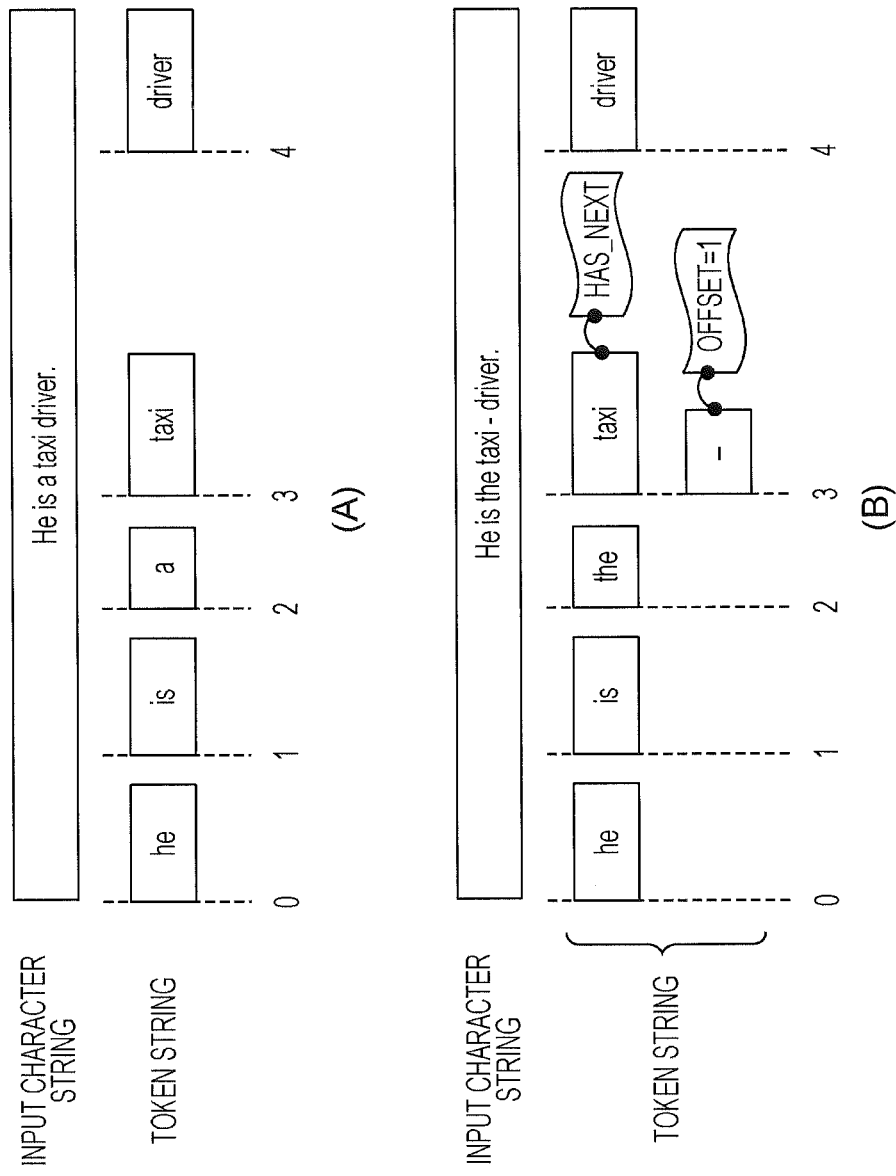
FIG. 3 is a schematic diagram illustrating a process between division of an input character string and indexing, performed by a character string analysis section and an index creation section, along with structures of data generated from the process.

FIGS. 3(A) and 3(B) are schematic diagrams illustrating a process between division of an input character string and indexing, performed by the character string analysis section 220 and the index creation section 230 to be described later, along with structures of data generated from the process. The description will be given below using a first example sentence, "He is a taxi driver", and a second example sentence, "He is the taxi-driver". Referring to FIG. 3(A), the token division unit 222 of FIG. 2 applies morphological analysis onto the first example sentence, "He is a taxi driver", thereby dividing an input character string of the first example sentence into five tokens, i.e., "he", "is", "a", "taxi", and "driver", and assigns the resulting tokens to the input character string. In the description, each of these tokens is set as a headword token.

Referring to FIG. 3B, when morphological analysis is applied onto the second example sentence, "He is the taxi-driver", the token division unit 222 of FIG. 2 divides an input character string of the second example sentence into six tokens, i.e., "he", "is", "the", "taxi", "-", and "driver". Regarding the second example sentence, the symbol "-" is also obtained as a token in addition to the five headword tokens. In the description, this token "-" is set as an exclusion token.

During the token division process, the token division unit 222 forms a data structure that holds positional relationships between the tokens for the tokens divided from the input character string, and writes the resulting data structure in the analysis data. In this embodiment, headword tokens and exclusion tokens are separately pre-registered in the dictionary storage unit 226. The token division unit 222 writes the analysis data such that whether each token is a headword token or an exclusion token is identifiable.

The character string analysis section 220 can start character string analysis on unprocessed content, but not limited to, in response to an instruction externally supplied from a system administrator, in accordance with a schedule preset by the system administrator, or once a predetermined amount of content to be updated or added that is preset by the system administrator is newly stored in the content storage unit 212.

(2) Index Creation Performed by Server

Referring again to FIG. 2, the index creation section 230 reads out the analysis data stored in the analysis data storage unit 214. The index creation section 230 then assigns a position number and additional information to each token of a token string to enable a phrase search, thereby creating index data. More specifically, the index creation section 230 includes a token position definition unit 232, a position offset information assigning unit 234, and an indexing processing unit 236.

The token position definition unit 232 defines and assigns an occurrence position number (TOKEN_POS: hereinafter simply referred to as a position number) to each token on the basis of the positional relationships between the tokens included in the corresponding analysis data. In an index entry, the position number (TOKEN_POS) identifies a position where the token appears in the corresponding document data. As described above, there are headword tokens and exclusion tokens among tokens included in the analysis data. The position numbers (TOKEN_POS) are defined for the headword tokens in the order that the headword tokens appear, with the exclusion tokens being ignored.

The position offset information assigning unit 234 assigns to each exclusion token among one or more divided tokens, position information that is obtained with a headword token followed by this exclusion token being set as the starting point. Here, the position information includes a position number for identifying a position where this exclusion token appears and position offset information that determines a positional relationship of this exclusion token with respect to the starting-point headword token followed by this exclusion token. The position number of the exclusion token is the same as that of the starting-point headword token followed by this exclusion token. The position offset information specifically indicates a positional difference between the exclusion token and the headword token serving as the starting point for the exclusion token (hereinafter, this positional difference is referred to as a position offset value).

The indexing processing unit 236 associates the document identifier (DOC_ID) for identifying corresponding content, a token, a position number (TOKEN_POS) where the token appears, and additional information (if any) with each other, and adds a resulting index entry to the index data. At this time, for both headword tokens and exclusion tokens, the indexing processing unit 236 adds an index entry in a manner such that it is identifiable whether or not there is an exclusion token following this token.

Indexing is performed by the token position definition unit 232, the position offset information assigning unit 234, and the indexing processing unit 236 in the following manner in brief. Now, referring again to FIGS. 3(A) and 3(B), the first example sentence illustrated in FIG. 3(A) is divided into five tokens. In this case, the token position definition unit 232 defines position numbers for the five headword tokens in the order that the tokens appear.

On the other hand, the second example sentence illustrated in FIG. 3(B) includes one exclusion token "-" in addition to the five headword tokens. The token position definition unit 232 ignores the exclusion token "-", and defines position numbers for the five headword tokens in the order that the tokens appear. Accordingly, in the example illustrated in FIGS. 3(A) and 3(B), a position number (TOKEN_POS=3) and a position number (TOKEN_POS=4) are defined for "taxi" and "driver", respectively, regardless of whether or not an exclusion token exists therebetween.

The position offset information assigning unit 234 assigns, to the exclusion token "-", the same position number (TOKEN_POS=3) as the starting-point headword token "taxi" followed by this exclusion token, and a position offset value (OFFSET=1) from the starting-point headword token "taxi".

Referring to FIG. 3(B), additional information (HAS_NEXT=true) is further assigned to the headword token "taxi" followed by the exclusion token "-". This additional information is assigned to the token so that presence of a following exclusion token is identifiable. The value "true" of the additional information (HAS_NEXT) indicates that there is a following exclusion token, whereas the value "false" or omission of the additional information (HAS_NEXT) indicates that there is no following exclusion token. In this manner, the indexing processing unit 236 attaches the additional information (HAS_NEXT=true) to a headword token followed by an exclusion token to perform indexing, thereby making it possible to easily identify that the headword token is followed by an exclusion token even after inverted indexing.

FIG. 4(A) is a diagram describing the process between division of an input character string into tokens and indexing performed on another example sentence. Referring to FIG. 4(A), two symbols "-" are consecutively arranged. In this case, the position offset information assigning unit 234 assigns, to each of the two exclusion tokens "-", the same position number (TOKEN_POS=3) as the headword token "taxi" serving as the starting point of these tokens. The position offset information assigning unit 234 further assigns a position offset value (OFFSET=1) to the first exclusion token "-", and assigns a position offset value (OFFSET=2) to the second exclusion token "-" in accordance with the positional relationships between the exclusion tokens and the starting-point headword token.

Additionally, the additional information (HAS_NEXT=true) is assigned to the first exclusion token followed by the second exclusion token "-". As described above, this information is attached so that presence of a following token is identifiable. The indexing processing unit 236 attaches the additional information (HAS_NEXT=true) to an exclusion token followed by another exclusion token to perform indexing, thereby making it possible to easily identify that the token is followed by an exclusion token even after inverted indexing.

Although the additional information has been described as information for identifying a token followed by an exclusion token in the embodiment, the additional information is not limited to this particular example as long as a token followed by an exclusion token is identifiable after inverted indexing. For example, in another embodiment, additional information (NOT_HAVE=true) may be assigned to a token that is not followed by an exclusion token as illustrated in FIG. 4(B). The additional information (NOT_HAVE=true) may be used as information indicating a token is not followed by an exclusion token.

Additionally, although it has been described in the embodiment that the position number is defined by setting a difference between position numbers of consecutive headword tokens to a fixed value "1", fixed values other than "1" may be used. Additionally, the difference is not limited to the fixed value as long as a phrase search is supported, and the index creation process is applicable to various modifications.

The index creation section 230 organizes, for each of headwords (including words corresponding to exclusion tokens), index entries obtained for each analysis data (content), thereby performing final inverted indexing. The index creation section 230 then stores resulting index data in the index storage unit 216. At this time, the index creation section 230 may organize and attach a statistical value calculated using term frequency-inverse document frequency (tf-idf) for each headword in the entire index data.

Meanwhile, the data used for search 106 and 112 illustrated in FIG. 1 may include the index data and the analysis data stored in the index storage unit 216 and the analysis data storage unit 214, respectively, illustrated in FIG. 2. The analysis data may also be used for generating a content summary to be included in a search result.

(3) Index Creation Method Executed by Server

Figure 5:
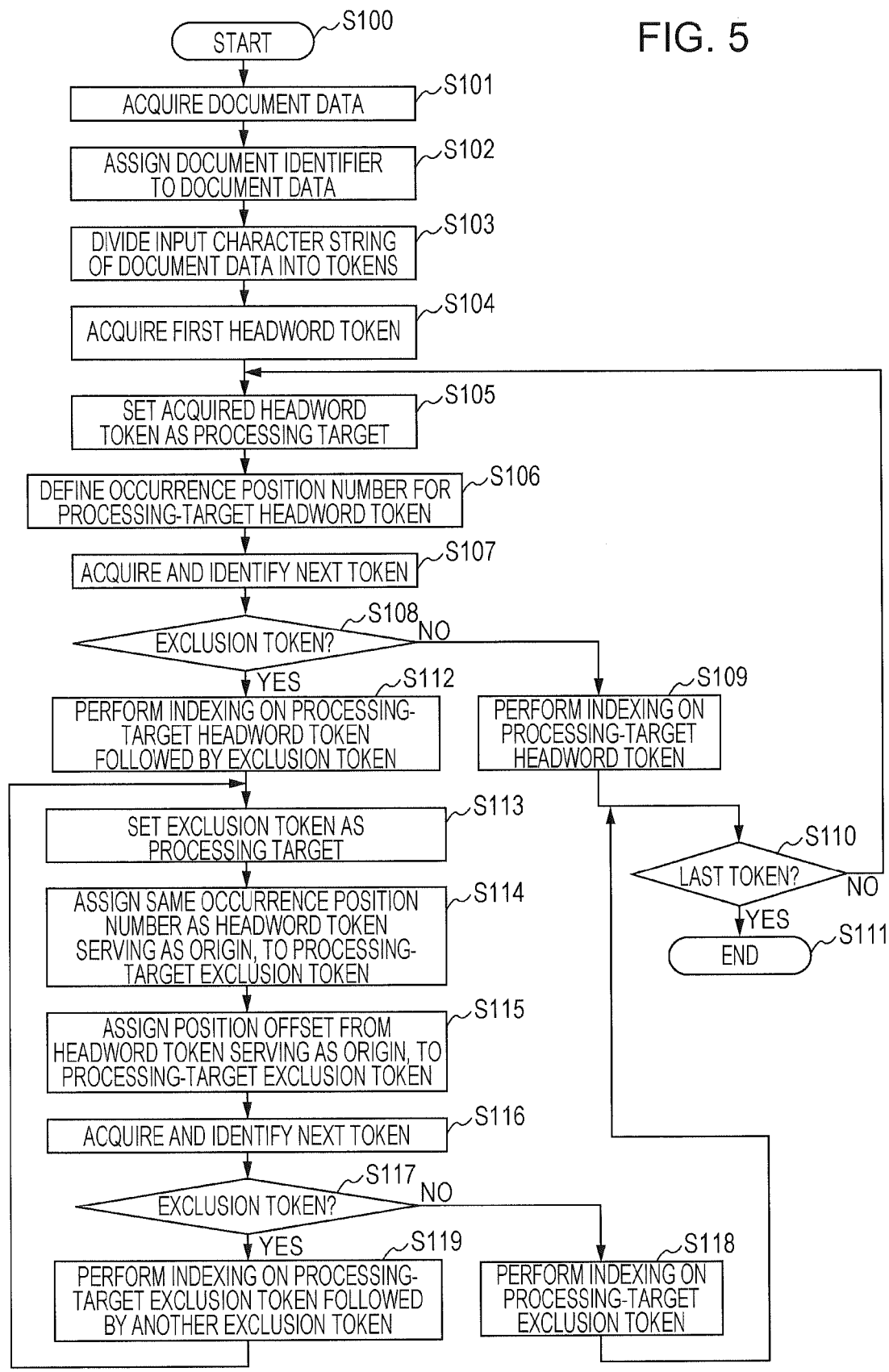
FIG. 5 is a flowchart illustrating an index creation method executed by the server serving as an index creation apparatus according to an embodiment.

FIG. 5 is a flowchart illustrating an index creation method executed by the server 104 that serves as the index creation apparatus according to this embodiment. The process illustrated in FIG. 5 starts from at block S100 in response to an external instruction, in response to scheduled timing, or in response to addition of new analysis data. Although FIG. 5 describes a process to be performed for each document data of newly added content, re-indexing involving update of content can also be performed in the same manner as the process illustrated in FIG. 5.

At block S101, the character string analysis section 220 extracts an input character string from content stored in the content storage unit 212, and acquires document data. At block S102, the character string analysis section 220 assigns a document identifier (DOC_ID) that uniquely identifies content (document data) in index data. At block S103, the character string analysis section 220 divides the input character string of the acquired document data into one or more tokens by means of the token division unit 222. The resulting analysis data is stored in the analysis data storage unit 214.

At block S104, the index creation section 230 reads out the analysis data, and acquires a headword token located at the start. At block S105, the index creation section 230 sets the acquired headword token as a current processing target. At block S106, the index creation section 230 defines a position number for the processing-target headword token by means of the token position definition unit 232. The position number is defined, for example, by assigning a starting position number (TOKEN_POS=0) to the headmost headword token and then incrementing the position number for each following headword token by a fixed value.

At block S107, the index creation section 230 acquires a token that follows the processing-target headword token from the token string, and then determines whether or not the next token is an exclusion token. At block S108, the process branches depending on whether or not the next token is an exclusion token.

If it is determined that the next token is not an exclusion token at block S108 (NO), the process branches to block S109. In this case, it can be determined that there is no following exclusion token that starts from the current processing-target headword token. At block S109, the index creation section 230 associates the processing-target headword token with a set of the document identifier (DOC_ID) and the position number (TOKEN_POS), and adds a resulting index entry ("TOKEN" (DOC_ID, TOKEN_POS)), thereby performing indexing, by means of the indexing processing unit 236.

At block S110, the index creation section 230 determines whether or not there is no next token and the processing target has reached the end of the token string. If it is determined that the processing target has not yet reached the end of the token string at block S110 (NO), the process returns to block S105 and the index creation section 230 sets the next headword token of the current processing-target headword token as the new processing target, and repeats the processing starting from the block S105 until the processing target reaches the end of the token string.

On the other hand, if it is determined that the next token is an exclusion token at block S108 (YES), the process branches to block S112. In this case, there is a following exclusion token that starts from the current processing-target headword token. At block S112, the index creation section 230 associates the processing-target headword token with a set of the document identifier (DOC_ID), the position number (TOKEN_POS), and the additional information (HAS_NEXT=true) to indicate that there is a following exclusion token, and adds a resulting index entry ("TOKEN" (DOC_ID, TOKEN_POS, true)), thereby performing indexing by means of the indexing processing unit 236.

At block S113, the index creation section 230 sets, as the current processing target, the exclusion token that has been acquired as the next token. At block S114, the index creation section 230 assigns the same position number as the starting-point headword token to the current processing-target exclusion token by means of the position offset information assigning unit 234. At block S115, the index creation section 230 further calculates the position offset value (OFFSET) from the starting-point headword token and assigns the position offset value to the current processing-target exclusion token by means of the position offset information assigning unit 234.

At block S116, the index creation section 230 acquires the next token of the processing-target exclusion token, and identifies whether or not the next token is an exclusion token. At block S117, the process branches depending on whether or not the next token is an exclusion token.

If it is determined that the next token is not an exclusion token at block S117 (NO), the process branches to block S118. In this case, it can be determined that there is no exclusion token that follows the current processing-target exclusion token. At block S118, the index creation section 230 associates the processing-target exclusion token with a set of the document identifier (DOC_ID), the position number (TOKEN_POS), and the position offset value (OFFSET), and adds a resulting index entry ("TOKEN" (DOC_ID, TOKEN_POS, OFFSET)), thereby performing indexing by means of the indexing processing unit 236. The process then proceeds to block S110. In this case, whether or not the processing target has reached the end of the token string is determined at block S110. If it is determined that the processing target has not yet reached the end of the token string (NO), the process returns to block S105.

On the other hand, if it is determined that the next token is an exclusion token at block S117 (YES), the process branches to block S119. In this case, since there is an exclusion token that follows the current processing-target exclusion token, the index creation section 230 associates the processing-target exclusion token with a set of the document identifier (DOC_ID), the position number (TOKEN_POS), the position offset value (OFFSET), and the additional information (HAS_NEXT=true) to indicate that there is a following exclusion token, and adds a resulting index entry ("TOKEN" (DOC_ID, TOKEN_POS, OFFSET, true)), thereby performing indexing by means of the indexing processing unit 236 at block S119. In this case, the process then returns to block S113. The index creation section 230 sets the next exclusion token of the current processing target as the new processing target, and repeats the processing from block S113 to block S119 until the exclusion tokens starting from the headword token ends.

Referring again to block S110, if it is determined that the processing target has reached the end of the token string at block S110 (YES) after indexing is performed on the processing-target headword token at block S109 or on the processing-target exclusion token at block S118, the process branches to block S111 and the process performed on this content ends.

After the aforementioned index creation method is executed and the index creation section 230 completes inverted indexing by organizing the index entries for each token of each contents, index data illustrated in FIG. 6 is created. As illustrated in FIG. 6, for each headword token, a set in which the document identifier (DOC_ID) of the document data in which the headword token appears, the occurrence position (TOKEN_POS) in the document data, and the additional information (HAS_NEXT) (if any) indicating whether or not the token corresponding to the occurrence position is followed by an exclusion token are associated is registered in the index data.

For each exclusion token, a set in which the document identifier (DOC_ID) of document data in which the exclusion token appears, the occurrence position (TOKEN_POS) of the headword token serving as the starting point in the document data, the position offset value (OFFSET) from the starting point, and the additional information (HAS_NEXT) (if any) indicating whether or not the exclusion token corresponding to the occurrence position is followed by another exclusion token are associated is registered in the inverted index data.

As described above, in the index creation process according to this embodiment, even when an input character string of content includes exclusion tokens, the exclusion tokens are assigned position information relative to the starting-point headword token followed by the exclusion tokens. This enables a phrase search to be performed in consideration of exclusion tokens as described in detail later.

(4) Search Process Performed by Server

Now referring again to FIG. 2, the search section 240 performs a search process in response to a search request received from the client 102 with reference to the index data stored in the index storage unit 216, and performs a process of returning a search result to the client 102. More specifically, the search section 240 includes a search request reception unit 242, a search result creation unit 244, a search mode determination unit 246, a normal mode search processing unit 248, and a correction mode search processing unit 250.

The client 102 includes a search inquiry section 260. Software such as a web browser and a plug-in and hardware such as a processor and a RAM that provides a work area of the processor operate in cooperation with each other, whereby the search inquiry section 260 functions. More specifically, the search inquiry section 260 includes a search requesting unit 262, a search result display unit 264, and a correction mode specification unit 266.

In response to clicking of a search button 304 in a browser screen 300, for example, illustrated in FIG. 12(A) in a search, the search requesting unit 262 of the client 102 sends a search request including a search query entered at a search textbox 302 to the server 104. The search request may include a mode specification value that specifies whether a search is performed in a search mode in which positions of exclusion tokens are corrected and the exclusion tokens are considered (hereinafter, referred to as a correction mode) or in a search mode in which exclusion tokens are not considered (hereinafter, referred to as a normal mode). The mode specification value is set by the correction mode specification unit 266 in accordance with an operation performed on a graphical user interface (GUI) component (checkbox) 306 used for specifying the search mode provided in the browser screen 300, for example.

The search request reception unit 242 of the server 104 receives the search request sent from the search requesting unit 262 of the client 102, and acquires the mode specification value along with the search query regarding the search request. The search mode determination unit 246 determines the requested search mode with reference to the acquired mode specification value. If the correction mode is specified in which exclusion tokens are considered, the search mode determination unit 246 issues a search process request to the correction mode search processing unit 250. On the other hand, if the normal mode is specified in which exclusion tokens are not considered, the search mode determination unit 246 issues a search process request to the normal mode search processing unit 248.

The search query of the search request sent from the client 102 includes a search character string to be searched for. The search request reception unit 242 divides the search character string into search tokens, by using morphological analysis, thereby generating a search token string. When the search token string has one search token, a single word search is performed. When there are multiple search tokens, a phrase search is performed. In a single word search using a single search token, the positional relationship between tokens does not matter and thus the normal mode search process is performed regardless of the mode specification value.

When the normal mode is specified, the normal mode search processing unit 248 performs a search process in which exclusion tokens are ignored, with reference to the index data stored in the index storage unit 216 upon receiving the search process request. The normal mode search processing unit 248 acquires, as a result of the search process, a content inquiry set including tokens (strings) that match the search query regardless of relationships with exclusion tokens.

The single word search will be described. For example, when the single word search is requested by using a search token, e.g., "taxi", "driver", or "-", the normal mode search processing unit 248 acquires a content inquiry set that includes the specified search token, such as "taxi", "driver", or "-". Search tokens segmented from a search character string also include headword tokens and exclusion tokens as described above for the index creation process. Even when the search token "-" is an exclusion token, the exclusion token "-" is also indexed in the index data. Thus, in the single word search, an inquiry set including the token "-" can be acquired by treating the exclusion token "-" as a headword.

When the correction mode is specified, the correction mode search processing unit 250 performs a search process in consideration of exclusion tokens, with reference to the index data stored in the index storage unit 216 upon receiving a search process request. This search process will be described in detail later. The correction mode search processing unit 250 acquires, as a result of the search process, a content inquiry set containing token strings that match the search query, including relationships with exclusion tokens.

The search result creation unit 244 acquires a content list created by the normal mode search processing unit 248 or the correction mode search processing unit 250. The search result creation unit 244 provides the document identifier (DOC_ID) included in the list to the analysis data storage unit 214 to acquire the corresponding analysis data and a pointer to the content, thereby creating a search result. When ranking can be performed on contents in the inquiry set, the search result creation unit 244 can create the search result as data including content summaries, in which a predetermined number of contents in the inquiry set are sorted in the descending order of the total score and are assigned URIs or pathnames in a linkable manner.

The data of the created search result is sent to the client 102. The search result display unit 264 of the client 102 receives the data of the search result, and displays content summaries 312*a* and 312*b* on a browser screen 310 in a linkable manner by specifying the URI or pathname to each of the predetermining number of contents having high total scores.

(4-1) Phrase Search in Normal Mode

Figure 7:
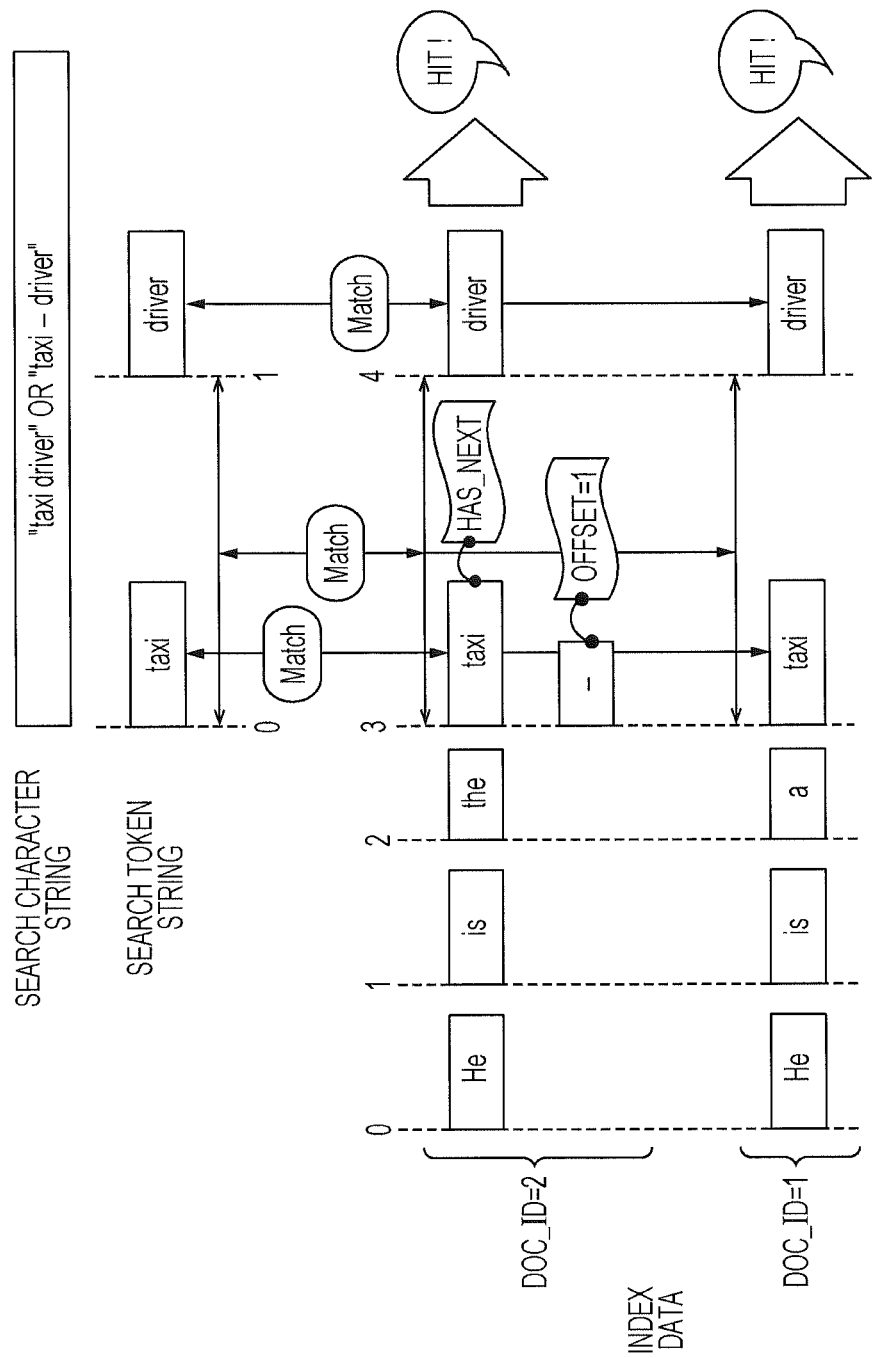
FIG. 7 is a diagram describing a normal mode phrase search process performed in the search system according to an embodiment.

A phrase search process in the normal mode will be described below. FIG. 7 is a diagram illustrating the normal mode phrase search process. FIG. 7 illustrates the process performed when "taxi driver" or "taxi-driver" is set as the search character string and there are index data for the first example sentence (DOC_ID=1) and index data for the second example sentence (DOC_ID=2). Since an exclusion token "-" is ignored in the search character string "taxi-driver", both search character strings are divided into search tokens "taxi" and "driver", which are sequentially assigned from the start the position number 0 (TOKEN_POS=0) and the position number 1(TOKEN_POS=1), respectively. Here, the difference between the position numbers of the search tokens "taxi" and "driver" is equal to one.

On the other hand, referring to the index data, both the document data of the first example sentence (DOC_ID=1) and the document data of the second example sentence (DOC_ID=2) include tokens "taxi" and "driver" having position numbers that differ by one, i.e., consecutive tokens. Both the first example sentence (DOC_ID=1) and the second example sentence (DOC_ID=2) have a token string that matches the search token string of the search query regarding the position numbers as well as the constituent tokens. Thus, the first and second example sentences are found as hits. At this time, the search result obtained in the normal mode is not affected by the fact that the token "taxi" of the second example sentence (DOC_ID=2) is attached with the additional information (HAS_NEXT=true) and there is the exclusion token "-" having the same position number as the token "taxi".

(4-2) Phrase Search in Correction Mode

Figure 8:
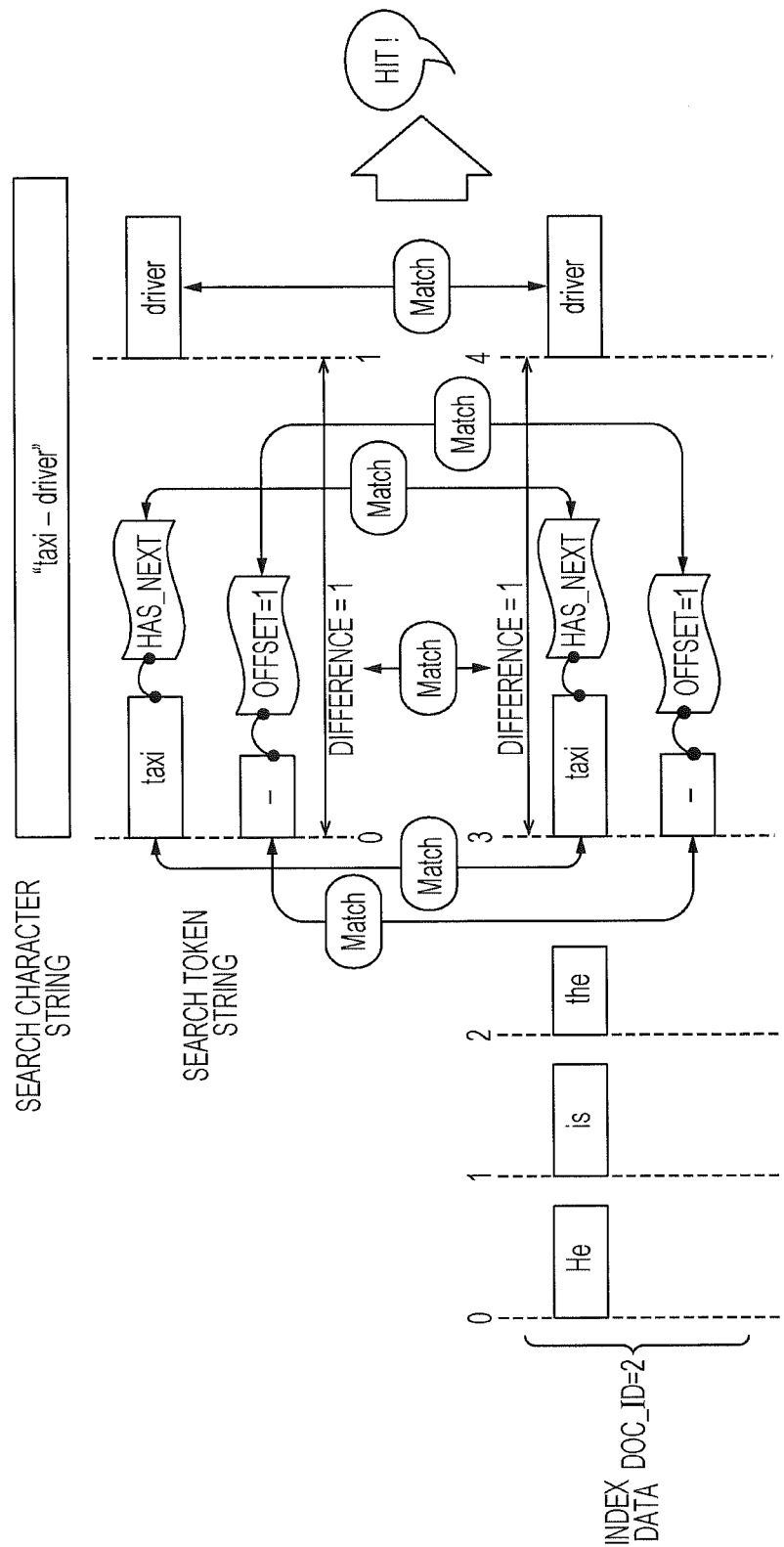
FIG. 8 is a diagram describing a correction mode phrase search process performed in the search system according to an embodiment.
Figure 9:
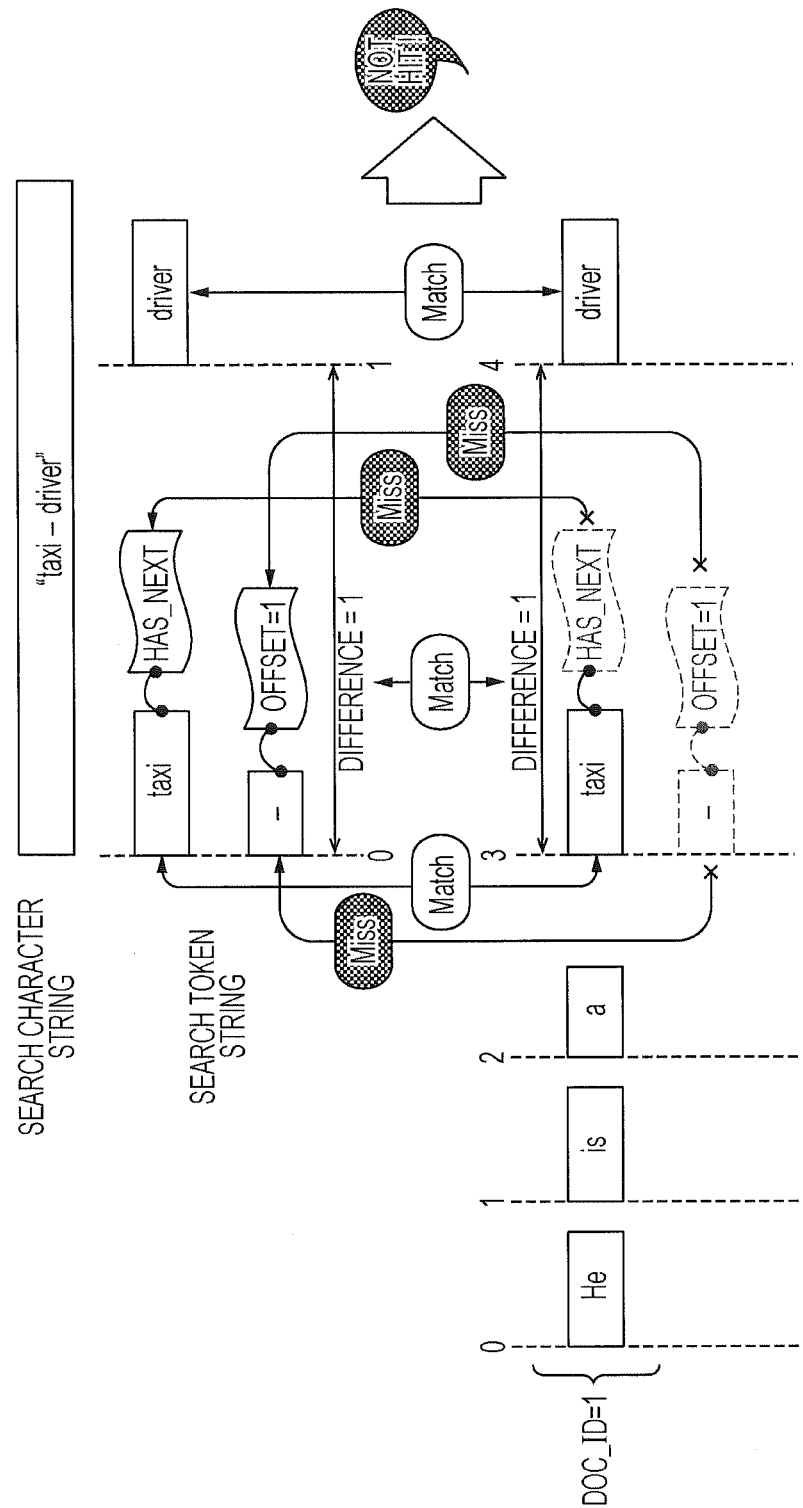
FIG. 9 is a diagram describing the correction mode phrase search process performed in the search system according to an embodiment.
Figure 10:
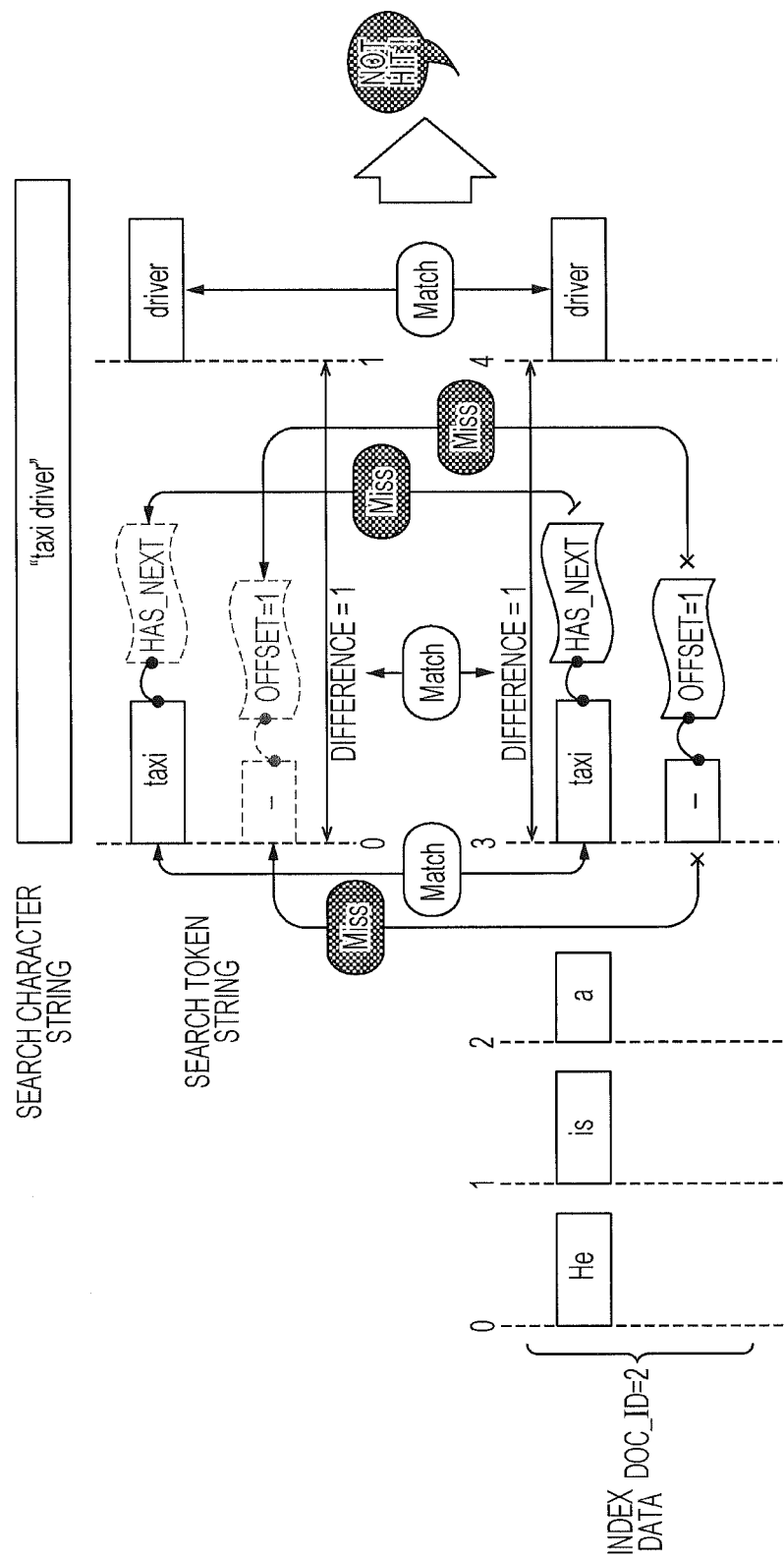
FIG. 10 is a diagram describing the correction mode phrase search process performed in the search system according to an embodiment.

A phrase search process in the correction mode will be described below. FIGS. 8 to 10 are diagrams describing the phrase search process in the correction mode. FIG. 8 illustrates the process performed when "taxi-driver" is set as the search character string and there is index data for the second example sentence (DOC_ID=2).

Since the exclusion token "-" is considered in the correction mode, the search character string "taxi-driver" is divided into three search tokens "taxi", "-", and "driver". Even in the correction mode, the exclusion token "-" is excluded when position numbers are calculated. Thus, the tokens "taxi" and "driver" are assigned sequentially from the start the position number 0 (TOKEN_POS=0) and the position number 1 (TOKEN_POS=1), respectively.

Since a search is performed in consideration of exclusion tokens in the correction mode, additional information is also attached to a search token string as in the index creation process. The headword token "taxi" followed by the exclusion token "-" is attached with the additional information (HAS_NEXT=true) that indicates presence of a following exclusion token. The exclusion token "-" is assigned the position number 0 (TOKEN_POS=0) which is the same as that of the preceding headword token "taxi" and the position offset value (OFFSET=1).

On the other hand, referring to the index data, the document data of the second example sentence (DOC_ID=2) includes the tokens "taxi" and "driver" having the position numbers that differ by one. Furthermore, in the document data of the second example sentence (DOC_ID=2), the token "taxi" is attached with the additional information (HAS_NEXT=true), the exclusion token "-" exists at the same position number as that of the token "taxi", and the exclusion token "-" is attached with the position offset value (OFFSET=1).

Thus, in the example illustrated in FIG. 8, the second example sentence (DOC_ID=2) is found as a hit since it has a token string that matches the search token string constituting the search query, not only in constituent tokens but also in a concatenation relationship between the headword tokens (position numbers) and a concatenation relationship with the exclusion token (including the additional information, and the position number and the position offset value of the exclusion token).

FIG. 9 illustrates the process performed when "taxi-driver" is set as the search character string and there is index data for the first example sentence (DOC_ID=1). In this case, the search token string is the same as that described for FIG. 8 above.

Referring to the index data, the document data of the first example sentence (DOC_ID=1) includes tokens "taxi" and "driver" having position numbers that differ by one. However, in the document data of the first example sentence (DOC_ID=1), the token "taxi" is not attached with the additional information (HAS_NEXT=false) and there is no exclusion token "-" at the same position number as that of the token "taxi". That is, the first example sentence (DOC_ID=1) includes the token string that matches the search token string constituting the search query in the constituent headword tokens and the concatenation relationship between the headword tokens (position numbers), but not in the concatenation relationship with the exclusion token (including the additional information, and the position number and the position offset value of the exclusion token). Thus, the first example sentence is not set as a hit.

FIG. 10 illustrates the process performed when "taxi driver" is set as the search character string and there is index data for the second example sentence (DOC_ID=2). In this case, the search character string is divided into two search tokens, i.e., "taxi" having the position number (TOKEN_POS=0) and "driver" having the position number (TOKEN_POS=1).

Since exclusion tokens are considered in the correction mode, the additional information is attached to the search token string if necessary. The headword tokens "taxi" and "driver" that are not followed by an exclusion token are attached with the additional information (HAS_NEXT=false) that indicates there is no following exclusion token or the additional information is omitted.

Referring to the index data, the document data of the second example sentence (DOC_ID32 2) includes tokens "taxi" and "driver" having position numbers that differ by one. However, in the second example sentence (DOC_ID=2), the token "taxi" has the additional information (HAS_NEXT=true) and further there is the exclusion token "-" having the position offset value (OFFSET=1) at the same position number as that of the token "taxi".

That is, the second example sentence (DOC_ID=2) includes a token string that matches the search token string constituting the search query in the constituent headword tokens and the headword token concatenation relationship, but the token string includes the exclusion token which does not exist in the search token string. Since there is no token string that matches the search token string, including the exclusion token concatenation relationship, the second example sentence is not set as a hit.

(4-3) Ranking

Figure 11:
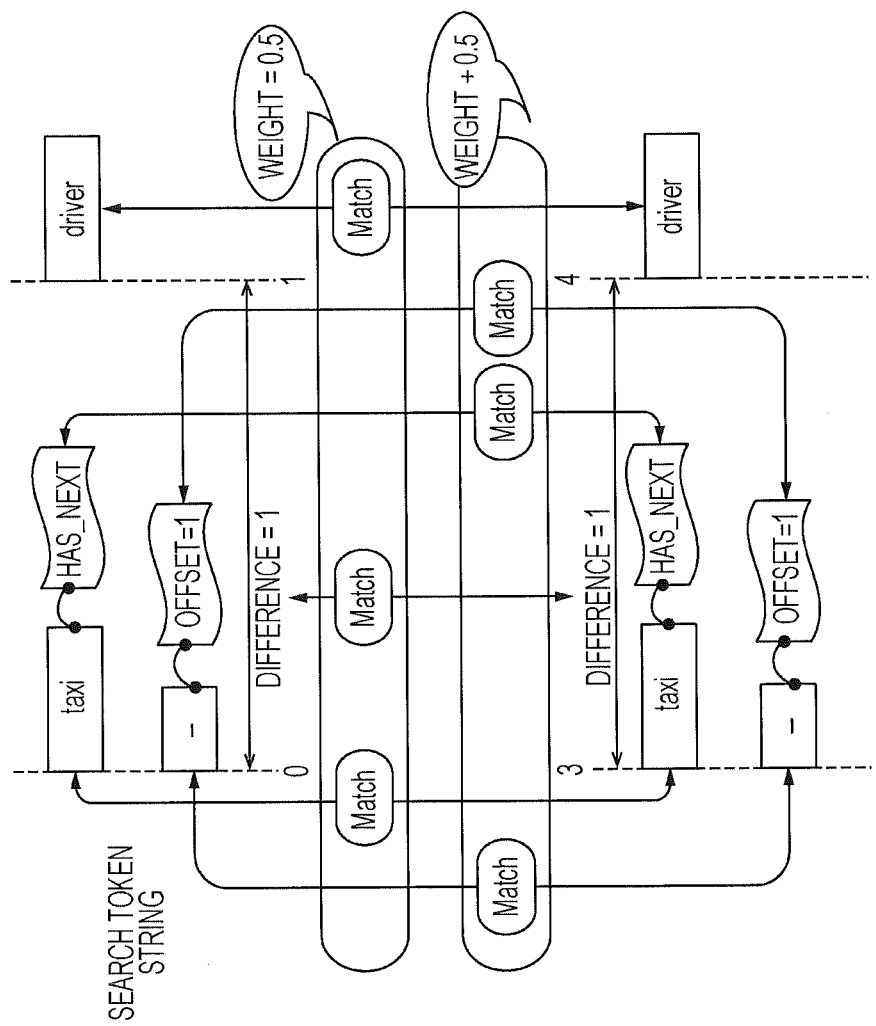
FIG. 11 is a diagram describing weighting used in ranking in an embodiment.

A ranking process for creating a search result will be described below. FIG. 11 is diagram describing weighting used in ranking in the embodiment. By using the index data according to the embodiment, it is possible to discriminate between completely matching token strings that match the search token string in the headword token concatenation relationship and the exclusion token concatenation relationship, and conditionally matching token strings that match the search token string in the headword token concatenation relationship, but not in the exclusion token concatenation relationship. Accordingly, in the search system 100 according to the embodiment, different weights can be applied to complete matches and conditional matches so as to create a difference in ranked results.

For example, in a specific embodiment, a weight "0.5" is applied when the headword token concatenation relationships match and "0.5" is further added to the weight when the exclusion token concatenation relationships additionally match as illustrated in FIG. 11. In this way, a heavier weight can be applied to complete matches than conditional matches.

The total store calculated for content is, for example, a sum of a score obtained by multiplying the number of times the completely matching token string appears in the document data by the weight for a completely match (the number of complete matches×1) and a score obtained by multiplying the number of times the conditionally matching token string appears in the document data by the weight for a conditional match (the number of conditional matches×0.5).

With the above configuration, it is possible to provide a search result obtained in consideration of matching of exclusion tokens and to arrange content that is more similar to the search character string entered by a searcher in higher ranks. Additionally, by including conditionally matching content that does not completely match the search character string in the search result and performs the ranking, an insufficient search can be suppressed and a high-quality search can be performed.

(4-4) Proper Phrase Search

The description has been given above that the normal mode or the correction mode is specified as the search mode by the correction mode specification unit 266 of the client 102. However, the correction mode search process can be invoked without requesting the client 102 to perform a difficult operation, by pre-registering proper phrases to be searched for in the correction mode.

Figure 13:
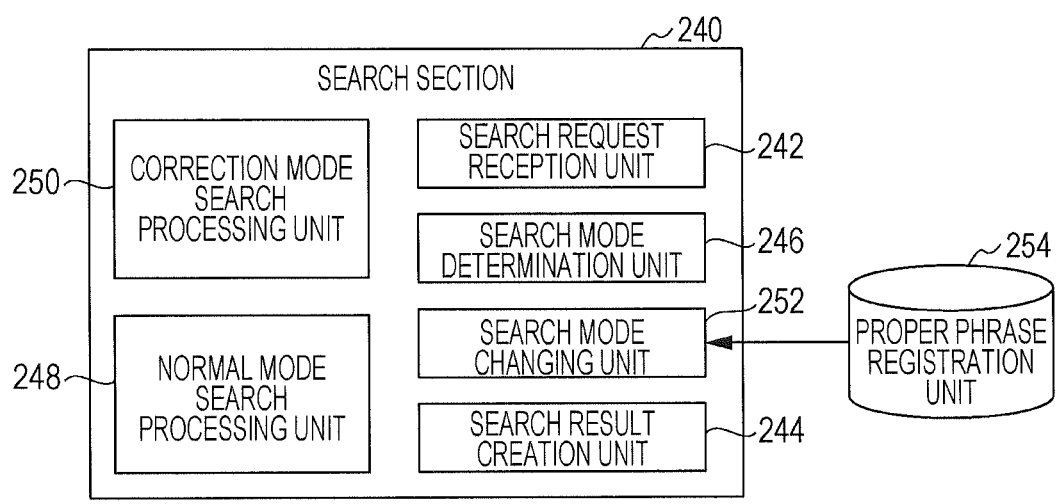
FIG. 13 is a functional block diagram of a search section implemented in a server according to an embodiment in which proper phrases can be registered.

FIG. 13 is a functional block diagram of the search section 240 which is implemented in the server 104 according to an embodiment in which proper phrases can be registered. Referring to FIG. 13, the search section 240 includes a search mode changing unit 252 and a proper phrase registration unit 254 in addition to the search request reception unit 242, the search result creation unit 244, the search mode determination unit 246, the normal mode search processing unit 248, and the correction mode search processing unit 250 which are also illustrated in FIG. 2.

The proper phrase registration unit 254 stores pre-registered proper phrases (proper token strings). A proper phrase is a pre-registered phase so that, when a token string of a search character string includes the proper token string, a search is performed at least on a part corresponding to the proper token string in consideration of exclusion tokens even if the specified mode is the normal mode. Meanwhile, in the embodiment described, it is assumed that a correction mode search is performed on the entire search token string when a search token string of a search character string includes a proper token string. However, in another embodiment, the search may be performed in consideration of exclusion tokens only on a part corresponding to the proper token string.

Also in the embodiment in which proper phrases can be registered, the correction mode specification unit 266 of the client 102 can set the mode specification value in response to an operation performed on the GUI component 306 of the browser screen 300. The search mode changing unit 252 compares a search token string divided from a search character string included in a search query with proper phrases (proper token strings) registered in the proper phrase registration unit 254, and determines whether or not the search query includes a proper phrase. If the search query includes a proper phrase, the search mode changing unit 252 changes the search mode to the correction mode regardless of the specified search mode. In response to changing of the search mode to the correction mode, the search mode determination unit 246 issues a search process request to the correction mode search processing unit 250.

By registering proper phrases, such as company names, project names, and product names, in the proper phrase registration unit 254, it is possible to return a search result in which exclusion tokens are implicitly considered, without requesting a searcher to perform an additional operation even when a search query includes a registered proper phrase.

For example, suppose that a word "A-B" is a product name and is important for a searcher. In the normal mode search, "-" is ignored and words such as "A/B" and "A B" that do not correctly match "A-B" are found as hits. This result is not necessarily desired by the searcher. In contrast, when the search character string includes the proper phrase "A-B", words that correctly matches "A-B" are found as hits by registering the word "A-B" as a proper phrase, and words such as "A/B" and "A B" that do not correctly match "A-B" can be ranked with a lighter weight or excluded from the hits.

Meanwhile, words such as company names, project names, and product names can be registered as proper nouns in a dictionary during indexing. In this case, however, the index data has to be re-created from the start every time a proper noun is added. In contrast, in the described embodiment, the index data does not have to be re-created from the start. By simply registering proper phrases in the proper phrase registration unit 254, it is possible to return a search result in which exclusion tokens are implicitly considered regarding a specific proper phrase, using the existing index data.

(5) Search Method Executed by Server

Figure 14:
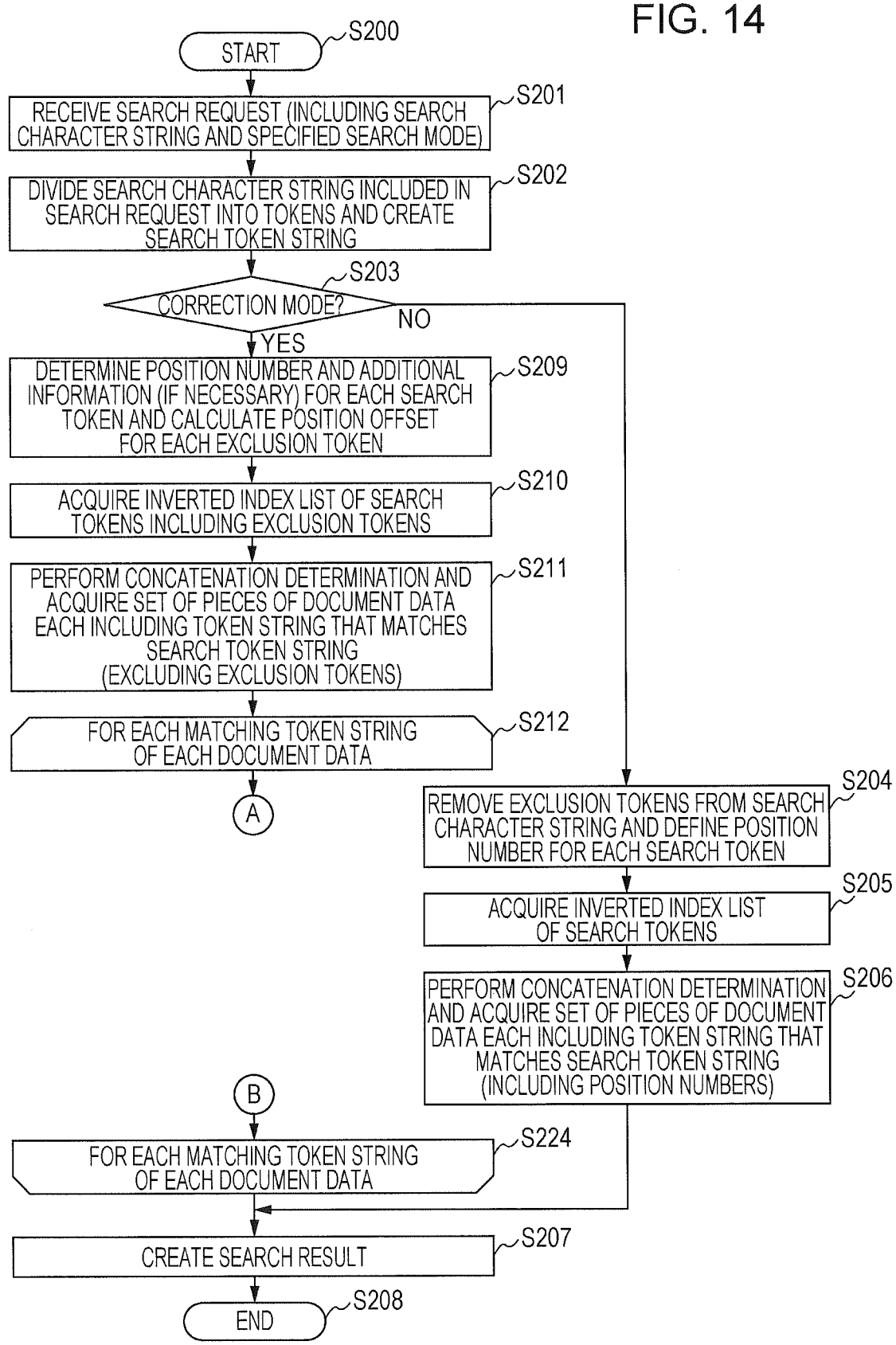
FIG. 14 is a flowchart illustrating a phrase search method executed by the server serving as a search apparatus according to an embodiment.
Figure 15:
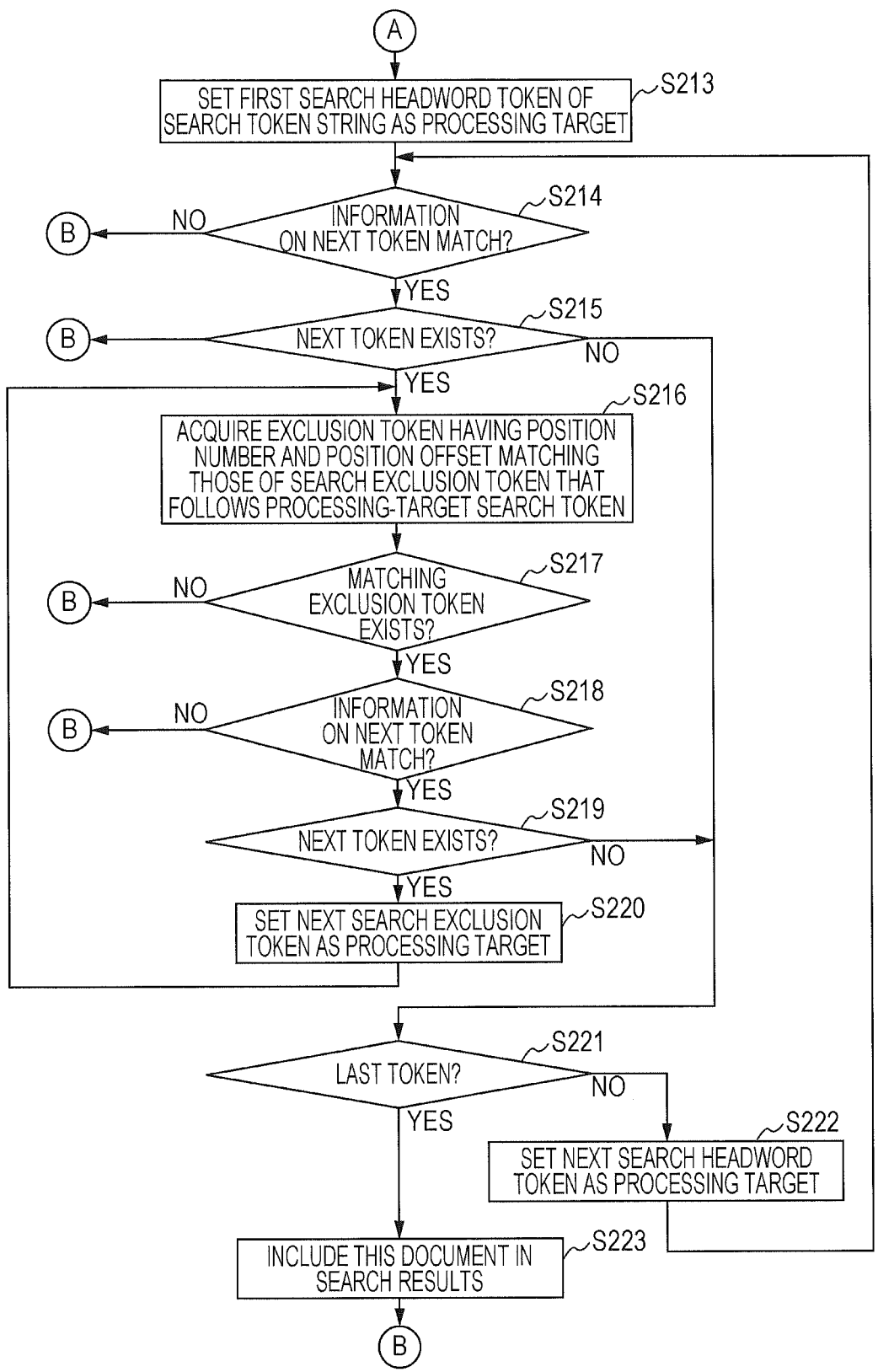
FIG. 15 is a flowchart illustrating the phrase search method executed by the server serving as the search apparatus according to an embodiment.

FIGS. 14 and 15 are flowchart illustrating a phrase search method executed by the server 104 serving as the search apparatus according to the embodiment. It should be noted that processes illustrated in FIGS. 14 and 15 are connected through connecting points A and B.

The processes illustrated in FIGS. 14 and 15 start from block S200 in response to reception of a search request from the client 102. At block S201, the search section 240 receives the search request sent from the client 102 by means of the search request reception unit 242. The search request includes a search character string and a specified search mode. At block S202, the search section 240 divides the search character string included in the search request into one or more search tokens, and generates a search token string.

At block S203, the search section 240 determines the search mode by means of the search mode determination unit 246. If it is determined that the search mode is not the correction mode at block S203 (NO), the process branches to block S204 and a search is performed in the normal mode.

At block S204, the search section 240 deletes exclusion tokens from the search token string, and calculates the position number of each search token by means of the normal mode search processing unit 248. At block S205, the search section 240 acquires an inverted index list corresponding to each search token from the index storage unit 216. Here, the inverted index list indicates a list that includes, for a given token, an array of a document in which the token appears, an occurrence position of the token, and additional information if any, among inverted index data organized for each token in the index storage unit 216.

At block S206, the search section 240 performs a concatenation check and acquires a set of pieces of document data (content list) each including a token string that matches the search token string (from which exclusion tokens have been already excluded, not only in the constituent tokens but also in the position numbers, by means of the normal mode search processing unit 248. The process then proceeds to block S207. At block S207, the search section 240 acquires corresponding analysis data, a pointer to the content, and so forth by using the content list created by the normal mode search processing unit 248, creates a search result, and returns the search result as a response to the search request to a source of the request, by means of the search result creation unit 244. At block S208, the search section 240 terminates the search process.

On the other hand, if it is determined that the search mode is the correction mode at block S203 (YES), the process branches to block S209 and a search is performed in the correction mode. At block S209, the search section 240 calculates the position number of each search token of the search token string, determines the additional information if necessary, and further calculates the position offset value (OFFSET) for exclusion tokens if necessary by means of the correction mode search processing unit 250. At block S210, the search section 240 acquires an inverted index list that corresponds to each search token from the index storage unit 216.

At block S211, by means of the correction mode search processing unit 250, the search section 240 performs a concatenation check, and acquires an inquiry set of pieces of document data each including a token string that matches the search token string (exclusion tokens are excluded here), in the constituent tokens and the position numbers. The process then proceeds to block S212. At blocks S212 to S224, by means of the correction mode search processing unit 250, the search section 240 performs processing of blocks S213 to S223 on each matching point of each document data.

At block S213, the correction mode search processing unit 250 sets as a processing target a headword token (hereinafter, referred to as a search headword token) located at the start of the search token string. At block S214, the correction mode search processing unit 250 compares the processing-target search headword token with a headword token of a matching point in the index, and determines whether or not pieces of additional information match. If it is determined that the pieces of additional information disagree at block S214 (NO), such as when the search token is attached with the additional information (HAS_NEXT=true) but the headword token in the index is not attached with the additional information (HAS_NEXT=false), and in the opposite case, the process branches to block S224 through the connecting point B and the process is performed for the next matching point.

On the other hand, if it is determined that both the search token and the headword token in the index are attached with the additional information (HAS_NEXT=true) or are not attached with the additional information (HAS_NEXT=false) at block S214 (YES), the process proceeds to block S215.

At block S215, whether or not the matching pieces of additional information are "HAS_NEXT=true" (i.e., whether or not there is a following exclusion token) is determined. If it is determined that the matching pieces of additional information are "HAS_NEXT=false" and there is no following exclusion token at block S215 (NO), the process branches to block S221, and whether or not the processing target has reached the end of the search token string. If it is determined that the processing target has not reached the end at block S221 (NO), the process branches to block S222 and the next search headword token is set as the processing target. The process then returns to block S214.

On the other hand, if it is determined that the matching pieces of additional information are "HAS_NEXT=true" and there is a following exclusion token at block S215 (YES), the process proceeds to block S216. At block S216, the correction mode search processing unit 250 attempts to acquire an exclusion token that matches an exclusion token (hereinafter, referred to as a search exclusion token) that follows the current processing-target search token, including the position number and the position offset value, with reference to the corresponding inverted index list.

At block S217, whether or not the matching exclusion token has been found at block S216 is determined. Here, it is determined that the matching exclusion token exists on condition that there is an entry having the matching position number and the matching position offset value in the inverted index list that corresponds to the search exclusion token.

If it is determined that there is no matching exclusion token at block S217 (NO), the process branches to block S224 through the connecting point B and the process is performed on the next matching point. On the other hand, if it is determined that the matching exclusion token exists at block S217 (YES), the process proceeds to block S218.

At block S218, the correction mode search processing unit 250 compares the search exclusion token that follows the current processing-target search token with an exclusion token of the matching point in the index, and determines whether or not pieces of additional information (HAS_NEXT) match. If it is determined that check results of a following token disagree at block S218 (NO), such as when the search exclusion token is attached with the additional information (HAS_NEXT=true) but the exclusion token in the index is not attached with the additional information (HAS_NEXT=false) or in the opposite case, the process branches to block S224 through the connecting point B and the process is performed on the next matching point. On the other hand, if it is determined that the pieces of additional information match at block S218 (YES), the process proceeds to block S219.

At block S219, the correction mode search processing unit 250 determines whether or not there is still another following exclusion token. If the matching pieces of additional information are "HAS_NEXT=false" and it is determined that there is no following exclusion token at block S219 (NO), the process branches to block S221 and whether or not the current exclusion token is the last token is determined. On the other hand, if the matching pieces of additional information are "HAS_NEXT=true" and it is determined that a following exclusion token exists at block S219 (YES), the process branches to block S220.

At block S220, the next search exclusion token is set as the processing target, and the process returns to block S216. In this case, hits are continuously checked until the processing target reaches the end of exclusion tokens that start from the processing-target search headword token.

If it is determined that the current exclusion token is the last token at block S221 (YES), the process branches to block S223. In this case, since the tokens match all tokens of the search token string, it can be determined that the matching point is a complete match. At block S223, the document data is included in the search result since the document data includes a completely matching token string. The process then proceeds to block S224 through the connecting point B and the process is performed on the next matching point.

After exiting from the loop between blocks S212 and S224, a set of pieces of document data (content list) including completely matching token strings is obtained in the search result. Thus, at block S207, by means of the search result creation unit 244, the search section 240 acquires the corresponding analysis data, a pointer to the content, and so forth using the content list created by the correction mode search processing unit 250, creates a search result, and returns the search result as a response to the search request to a source of the request. At block S208, the search section 240 terminates the search process.

As described above, exclusion tokens are also indexed in the index data created by the character string analysis section 220 and the index creation section 230 according to this embodiment. Regarding exclusion tokens, the index data is created in which each exclusion token is assigned position information (position number and position offset value) relative to the position of a headword token followed by this exclusion token. Accordingly, a search can be performed in consideration of exclusion tokens.

Both the normal mode search in which exclusion tokens are not considered and the correction mode search can be performed using the same index data. Furthermore, tokens that are each followed by an exclusion token are assigned additional information identifying presence of a following token. Thus, hits can be efficiently checked in inverted indexes. As a result, a search result can be obtained which correctly reflects the intention of a searcher and information retrieval having a high matching rate and efficiency is realized.

As described above, according to exemplary embodiments, it is possible to provide a search system, an index creation apparatus, a search apparatus, an index creation method, a search method, and a program that enable an information retrieval to be performed in consideration of tokens which are usually excluded from search targets, such as those for punctuation marks and symbols. Furthermore, according to exemplary embodiments, it is possible to provide a search system, an index creation apparatus, a search engine, an index creation method, a search method, and a program that permit a search result that accurately reflects the intention of a searcher to be efficiently provided.

Embodiments are suitably applicable to other languages, e.g., Japanese, German, French, Russian, Korean, Chinese, and Arabic, in addition to English used in the description.

Additionally, each functional section and processing of each functional section have been described for ease of understanding. However, in addition to the configuration in which a particular functional section performs particular processing, a function for performing the foregoing processing can be assigned to any functional section in consideration of the processing efficiency and programming efficiency at the time of implementation.

The functions as described herein can be realized by a computer-executable program which is written in an object-oriented programming language, such as C++, Java (registered trademark), Java (registered trademark) Beans, Java (registered trademark) Applet, JavaScript (registered trademark), Perl, or Ruby, or a query language such as SQL, and which can be distributed after being stored in a computer-readable recording medium or by being transmitted.

While described through particular embodiments, the present invention is not limited to such embodiments. Modifications, such as other embodiments, additions, alterations, and deletions, can be made within the range that can occur to those skilled in the art, and those modifications are included in the scope of the present invention as long as effects and advantages are realized in any of the modifications.

Exemplary embodiments provide a search system for performing a phrase search which has characteristics described below. The search system includes, as a functional unit for indexing, a position definition unit configured to set as an exclusion token a token that has been registered to be excluded in an occurrence position calculation and as a headword token, a token not to be excluded, regarding each of one or more tokens divided from an input character string to be searched and configured to define an occurrence position for each headword token. The search system further includes an information assigning unit configured to assign, to each exclusion token, position information obtained with a headword token followed by the exclusion token being set as the starting point, and an indexing processing unit configured to perform indexing on the one or more tokens such that whether or not an exclusion token follows the individual tokens is identifiable.

Moreover, the search system can include as, a functional unit for searching, a search processing unit configured to extract, when a search process considering exclusion tokens is requested in response to a phrase search query, a token string that matches a search token string contained in the phrase search query, in constituent tokens, and occurrence positions and position information of the constituent tokens, with reference to index data.

Furthermore, there can be provided an index creation apparatus including a functional unit for indexing included in the search system, an index creation method to be executed by the index creation apparatus, a search apparatus including the functional unit for searching included in the search system, a search method to be executed by the search apparatus, a program for implementing the index creation apparatus in a computer, and a program for implementing the search apparatus in a computer.

According to the foregoing configurations, exclusion tokens, which are not considered in a normal search, are also assigned position information obtained with headword tokens followed by the corresponding exclusion tokens being set as the starting point and are also indexed. Accordingly, a phrase search can be performed in consideration of exclusion tokens. As a result, a search result accurately reflecting the intention of a searcher can be obtained.

What is claimed is:

1. A search system for performing a phrase search, the search system comprising:
    a processor;
    a token division unit configured to divide an input character string to be searched into a plurality of tokens;
    a token position definition unit configured to set each token to be excluded in an occurrence position calculation as an exclusion token and to set each token to be included in the occurrence position calculation as a headword token, and to define an occurrence position for each headword token;
    a position offset information assigning unit configured to assign, to each of the exclusion tokens, position information obtained with the headword token followed by the exclusion tokens and to assign the headword token followed by the exclusion tokens as a starting point; and
    an indexing processing unit configured to perform indexing on the plurality of tokens such that whether or not the exclusion tokens follow one of the plurality of tokens is identifiable, wherein index data including the occurrence position to be assigned to each headword token, position information to be assigned to each of the exclusion tokens, and additional information for identifying whether or not the exclusion tokens follow one of the plurality of tokens;
    a search processing unit configured to extract, based on a search process considering exclusion tokens being requested in response to a phrase search query containing a search token string, a token string that matches the search token string not only in constituent tokens but also in occurrence positions and position information of the constituent tokens, with reference to the index data;
    a determination unit configured to determine whether or not a search process considering exclusion tokens is requested based on a setting of the phrase search query; and
    a changing unit configured to change, based on the search token string of the phrase search query including a token string that has been registered to be searched in consideration of exclusion tokens in a phrase search, a search process to be performed into a search process considering exclusion tokens regarding the registered token string, and wherein the search processing unit is configured to apply a first weight to an extracted token string that matches the search token string in the constituent tokens, the occurrence positions, and the position information, and the search processing unit is configured to apply a second weight to a token string that matches the search token string contained in the phrase search query in constituent headword tokens and occurrence positions of the constituent headword tokens and does not match the search token string in a concatenation relationship with one of the exclusion tokens.

2. The search system according to claim 1, wherein the position information to be assigned to each of the exclusion tokens and obtained with the headword token being set as the starting point includes the occurrence position of the headword token serving as the starting point and a difference between positions of the headword token and each of the exclusion tokens.

3. The search system according to claim 1, wherein the indexing processing unit is configured to perform the indexing by attaching a token followed by one of the exclusion tokens with additional information indicating that the token is followed by one of the exclusion tokens, or by attaching a token not followed by one of the exclusion tokens with additional information indicating that the token is not followed by one of the exclusion tokens.

4. A method executed by a processor for performing a phrase search, the method comprising:
    receiving a phrase search query containing a search token string comprising a plurality of tokens;
    setting, by a computer, each token to be excluded in an occurrence position calculation as an exclusion token and each token to be included in the occurrence position calculation as a headword token;
    reading index data including an occurrence position defined for each headword token constituting an input character string to be searched and with exclusion tokens being excluded, and position information to be assigned to each of the exclusion tokens and obtained with the headword token followed by the exclusion tokens;
    extracting, by the computer based on a search process considering the exclusion tokens being requested, a token string that matches the search token string contained in the phrase search query not only in constituent tokens but also in occurrence positions and position information of the constituent tokens;
    assigning, to each of the exclusion tokens, position information related to the headword token followed by the exclusion tokens and assigning the headword token followed by the exclusion tokens as the starting point;

performing indexing on the plurality of tokens such that whether or not the exclusion token follows one of the plurality of tokens is identifiable;

determining whether or not a search process considering the exclusion tokens is requested based on a setting of the phrase search query, changing, based on the search token string of the phrase search query including a token string that has been registered to be searched in consideration of the exclusion tokens in a phrase search, a search process to be performed into a search process considering the exclusion tokens regarding the registered token string;

applying a first weight to an extracted token string that matches the search token string in the constituent tokens, the occurrence positions, and the position information; and applying a second weight to a token string that matches the search token string contained in the phrase search query in constituent headword tokens and occurrence positions of the constituent headword tokens and does not match the search token string in a concatenation relationship with one of the exclusion tokens.

5. The method of claim 4, further comprising:
indexing by attaching a token followed by one of the exclusion tokens with additional information indicating that the token is followed by one of the exclusion tokens, or by attaching a token not followed by one of the exclusion tokens with additional information indicating that the token is not followed by one of the exclusion tokens.

6. A computer program product for performing a phrase search, the computer program product comprising:
a non-transitory computer readable storage medium having computer readable program code embodied therewith, the computer readable program code configured to perform a method comprising:

receiving a phrase search query containing a search token string comprising a plurality of tokens;

setting each token to be excluded in an occurrence position calculation as an exclusion token and each token to be included in the occurrence position calculation as a headword token;

reading index data including an occurrence position defined for each headword token constituting an input character string to be searched and with exclusion tokens being excluded, and position information to be assigned to each of the exclusion tokens and obtained with the headword token followed by the exclusion tokens;

extracting, based on a search process considering the exclusion tokens being requested, a token string that matches the search token string contained in the phrase search query not only in constituent tokens but also in occurrence positions and position information of the constituent tokens;

assigning, to each of the exclusion tokens, the position information related to the headword token followed by the exclusion tokens and assigning the headword token followed by the exclusion tokens as a starting point;

performing indexing on the plurality of tokens such that whether or not the exclusion tokens follow one of the plurality of tokens is identifiable;

determining whether or not a search process considering the exclusion tokens is requested based on a setting of the phrase search query;

changing, based on the search token string of the phrase search query including a token string that has been registered to be searched in consideration of the exclusion tokens in a phrase search, a search process to be performed into a search process considering the exclusion tokens regarding the registered token string;

applying a first weight to an extracted token string that matches the search token string in the constituent tokens, the occurrence positions, and the position information; and applying a second weight to a token string that matches the search token string contained in the phrase search query in constituent headword tokens and occurrence positions of the constituent headword tokens and does not match the search token string in a concatenation relationship with one of the exclusion tokens.

7. The computer program product of claim 6, wherein the computer readable program code is further configured to perform:
indexing by attaching a token followed by one of the exclusion tokens with additional information indicating that the token is followed by one of the exclusion tokens, or by attaching a token not followed by one of the exclusion tokens with additional information indicating that the token is not followed by one of the exclusion tokens.

* * * * *